US012595928B2

(12) United States Patent
Mou et al.

(10) Patent No.: US 12,595,928 B2
(45) Date of Patent: Apr. 7, 2026

(54) SYSTEM FOR DETECTING AND CLEANING AIR POLLUTION IN INDOOR SPACE WITH HEATING, VENTILATION AND AIR CONDITIONING

(71) Applicant: MICROJET TECHNOLOGY CO., LTD., Hsinchu City (TW)

(72) Inventors: Hao-Jan Mou, Hsinchu City (TW); Chin-Chuan Wu, Hsinchu City (TW); Yung-Lung Han, Hsinchu City (TW); Chi-Feng Huang, Hsinchu City (TW)

(73) Assignee: MICROJET TECHNOLOGY CO., LTD., Hsinchu City (TW)

( * ) Notice: Subject to any disclaimer, the term of this patent is extended or adjusted under 35 U.S.C. 154(b) by 435 days.

(21) Appl. No.: 18/302,980

(22) Filed: Apr. 19, 2023

(65) Prior Publication Data

US 2024/0210066 A1     Jun. 27, 2024

(30) Foreign Application Priority Data

Dec. 23, 2022     (TW) ................................... 111149772

(51) Int. Cl.
*F24F 11/64* (2018.01)
*B01D 46/42* (2006.01)
(Continued)

(52) U.S. Cl.
CPC ............ *F24F 11/64* (2018.01); *B01D 46/429* (2013.01); *B01D 46/442* (2013.01); *B01D 46/46* (2013.01);
(Continued)

(58) Field of Classification Search
CPC .......... F24F 11/64; F24F 11/523; F24F 11/74; F24F 11/89; F24F 11/58; F24F 8/30;
(Continued)

(56) References Cited

U.S. PATENT DOCUMENTS 11,649,977 B2 * 5/2023 He ........................... F24F 11/63
                                                        700/276
2020/0224915 A1 * 7/2020 Nourbakhsh ............ F24F 11/54

FOREIGN PATENT DOCUMENTS

CN        101377333 A      3/2009
CN        106016677 A     10/2016
(Continued)

*Primary Examiner* — Sean E Conley
(74) *Attorney, Agent, or Firm* — Birch, Stewart, Kolasch & Birch, LLP

(57) ABSTRACT

A system for detecting and cleaning air pollution in indoor space with heating, ventilation and air conditioning includes one or more outdoor gas detection devices, several indoor gas detection devices, several filtering devices, and a central controller. The central controller receives air pollution data detected by the gas detection devices, by connecting to a cloud device, performs an intelligent computation and comparison on the air pollution data to locate an air pollution location, and the cloud device transmits a control command intelligently and selectively to the central controller. Therefore, according to the control command, the central controller controls the air conditioning modulation mechanism of one or more HVAC components and enables the filtering devices to generate a directed air convection, thereby achieving the filtration of the air pollution to allow the indoor air pollution data to be a safety detection value.

30 Claims, 19 Drawing Sheets

(51) Int. Cl.

| | |
|---|---|
| *B01D 46/44* | (2006.01) |
| *B01D 46/46* | (2006.01) |
| *B01D 53/86* | (2006.01) |
| *B01D 53/88* | (2006.01) |
| *F24F 8/108* | (2021.01) |
| *F24F 8/158* | (2021.01) |
| *F24F 8/167* | (2021.01) |
| *F24F 8/22* | (2021.01) |
| *F24F 8/30* | (2021.01) |
| *F24F 11/523* | (2018.01) |
| *F24F 11/58* | (2018.01) |
| *F24F 11/74* | (2018.01) |
| *F24F 11/79* | (2018.01) |
| *F24F 11/89* | (2018.01) |
| *F24F 110/52* | (2018.01) |
| *F24F 110/64* | (2018.01) |
| *F24F 110/65* | (2018.01) |
| *F24F 110/66* | (2018.01) |
| *F24F 110/70* | (2018.01) |

(52) U.S. Cl.
CPC ....... *B01D 53/8696* (2013.01); *B01D 53/885* (2013.01); *F24F 8/108* (2021.01); *F24F 8/158* (2021.01); *F24F 8/167* (2021.01); *F24F 8/22* (2021.01); *F24F 8/30* (2021.01); *F24F 11/523* (2018.01); *F24F 11/58* (2018.01); *F24F 11/74* (2018.01); *F24F 11/79* (2018.01); *F24F 11/89* (2018.01); *B01D 2255/802* (2013.01); *B01D 2257/106* (2013.01); *B01D 2257/302* (2013.01); *B01D 2257/404* (2013.01); *B01D 2257/502* (2013.01); *B01D 2257/504* (2013.01); *B01D 2257/60* (2013.01); *B01D 2257/708* (2013.01); *B01D 2257/91* (2013.01); *B01D 2259/804* (2013.01); *B01D 2259/818* (2013.01); *B01D 2279/50* (2013.01); *F24F 2110/52* (2018.01); *F24F 2110/64* (2018.01); *F24F 2110/65* (2018.01); *F24F 2110/66* (2018.01); *F24F 2110/70* (2018.01)

(58) Field of Classification Search
CPC ....... F24F 8/22; B01D 46/429; B01D 46/442; B01D 46/46
See application file for complete search history.

(56) References Cited

FOREIGN PATENT DOCUMENTS

| CN | 210602120 U | 5/2020 |
|---|---|---|
| TW | M550806 U | 10/2017 |
| TW | M620865 U | 12/2021 |
| TW | 202225611 A | 7/2022 |

* cited by examiner

B11a

B1

B15

B14

B12

B13

A1

3

SYSTEM FOR DETECTING AND CLEANING AIR POLLUTION IN INDOOR SPACE WITH HEATING, VENTILATION AND AIR CONDITIONING

CROSS-REFERENCE TO RELATED APPLICATION

This non-provisional application claims priority under 35 U.S.C. § 119(a) to Patent Application No. 111149772 filed in Taiwan, R.O.C. on Dec. 23, 2022, the entire contents of which are hereby incorporated by reference.

BACKGROUND

Technical Field

The present invention relates to a system for detecting and cleaning air pollution in indoor space with heating, ventilation and air conditioning, in particular, to a system adapted to be utilized in an indoor space with a heating, ventilation and air conditioning system (HVAC system), thereby the circulative filtration and the rapid clean of the air pollution can be achieved to allow the indoor air pollution data to approach to a non-detection state (almost zero), making the gas (air) of the indoor space to a safe and breathable state.

Related Art

In light of people paying more and more attention to the ambient air quality in daily life, it is noted that the particulate matters (PM1, PM2.5, PM10), carbon dioxide, total volatile organic compounds (TVOC), formaldehyde and even particulates, aerogels, bacteria, viruses contained in the air might affect the human health, even might be life-threatening when exposure to these gases.

However, currently, it is not easy to control the indoor air quality since the affecting factors of the indoor air quality include not only the outdoor space air quality but also the air conditioning and the pollution sources in the indoor space (especially the dusts originated from poor circulation of air in the indoor space). Therefore, heating/air conditioners or air cleaners are utilized for improving the indoor air quality. Consequently, one of the solutions for improving indoor air quality is the modern air conditioning system utilized in the indoor space. For example, the heating, ventilation and air conditioning system (abbreviated as HVAC system) is a system or an apparatus which is collectively in charge of heating, ventilation, and air conditioning. Specifically, in the HVAC system, an HVAC device controller is utilized to control a heat pump, an air conditioner, a furnace, an air cleaner, a humidifier, an air scrubber, a dehumidifier, or other HVAC components (which may be in the indoor space or in an outdoor space) to adjust/improve the heating, ventilation, and air conditioning performances in the indoor space collectively. Furthermore, in the HVAC system, a plurality of channels communicating to the indoor space is utilized to improve the air quality in the indoor space. These HVAC components are common air processing apparatuses.

Consequently, it is an issue of the present invention for intelligently and rapidly detecting the indoor air pollution source, effectively removing the air pollution from the indoor space thereby making the gas (air) in the indoor space into a safe and breathable state, monitoring the air quality of the indoor space whenever and wherever possible, and implementing the aforementioned functions through an HVAC system.

SUMMARY

One object of the present invention is to provide a system for detecting and cleaning air pollution in indoor space with heating, ventilation and air conditioning. In the system, a heating, ventilation and air conditioning (HVAC) device provides an air conditioning modulation mechanism for performing air-heating, air-cooling, and ventilation in the indoor space. In the system, at least one outdoor gas detection device and a plurality of gas detection devices are utilized to detect and compare the indoor gas and the outdoor gas. Moreover, in the system, through the detection of filtering devices (for example, the ventilator, the cooker hood, or the air cleaner) and the indoor gas detection devices in the filtering devices in the indoor space, and through the wireless transmission of a central controller to receive an air pollution data and to control a cloud device, an intelligent computation and comparison is performed to locate an air pollution location in the indoor space, and the control command is transmitted intelligently and selectively to enable the filtering devices to be driven to generate a certain directed air convection, control the HVAC device to determine whether the gas exchange of the indoor space is to be performed, and control an air conditioning modulation mechanism of at least one HVAC component of the HVAC device, thus the circulative filtration and the rapid clean of the air pollution can be achieved by at least one filtering component of each of the filtering devices, allowing the indoor air pollution data to be a safety detection value in which the air pollution data approaches to a non-detection state (almost zero), and the gas (air) in the indoor space is cleaned to a safe and breathable state. Therefore, the air pollution in the indoor space can be filtered and cleaned instantly. Hence, a performance of locating the air pollution, guiding the air pollution, and cleaning and filtering the air pollution can be achieved.

In order to accomplish the above object(s), in the general embodiment of the present invention, a system for detecting and cleaning air pollution in indoor space with heating, ventilation and air conditioning includes a heating, ventilation and air conditioning (HVAC) device, at least one outdoor gas detection device, a plurality of indoor gas detection devices, a plurality of filtering devices, and a central controller. The HVAC device comprises a gate, at least one channel filtering element, at least one flow-guiding device, a plurality of channels, and at least one HVAC component. The channels are in communication with an indoor space. The gate controls an external gas to be introduced into the indoor space. The at least one flow-guiding device guides the external gas into the channels, so that the external gas is filtered by the at least one channel filtering element and then introduced into the indoor space again. The at least one HVAC component provides an air conditioning modulation mechanism for performing air-heating, air-cooling, and ventilation in the indoor space. The at least one outdoor gas detection device is configured to detect a qualitative property and a concentration of an air pollution of the external gas and output an outdoor air pollution data. The indoor gas detection devices are disposed in an indoor space and configured to detect a qualitative property and a concentration of an air pollution in the indoor space and output an indoor air pollution data. The filtering devices are disposed in the indoor space. Each of the filtering devices comprises at least one blower and at least one filtering component, and each of the filtering devices is provided with a corresponding one of the indoor gas detection devices. The central controller is configured to receive the outdoor air pollution data and the indoor air pollution data, and the central controller is configured to, by connecting to a cloud device, perform an intelligent computation and comparison on the outdoor air pollution data and the indoor air pollution data to locate an air pollution location in the indoor space, as well as transmitting a control command intelligently and selectively. According to the control command received by the central controller, the central controller controls the gate to be opened or closed so as to perform a gas exchange mechanism in the indoor space and to control the air conditioning modulation mechanism of the at least one HVAC component. The indoor gas detection device of at least one of the filtering devices receives the control command to enable the at least one blower of each of the filtering devices so as to generate an air convection which is directed, thereby achieving the filtration of the air pollution by the at least one filtering component of each of the filtering devices to allow the indoor air pollution data to be a safety detection value in which the indoor air pollution data approaches to a non-detection state, and the gas in the indoor space is cleaned to a safe and breathable state.

BRIEF DESCRIPTION OF THE DRAWINGS

The invention will become more fully understood from the detailed description given herein below, the illustration is only for describing and thus not limitative of the invention, wherein.

DETAILED DESCRIPTION

The present invention will now be described more specifically with reference to the following embodiments. It is to be noted that the following descriptions of different embodiments of this invention are presented herein for purpose of illustration and description only, and it is not intended to limit the scope of the present invention.

Please refer to FIG. 1A, FIG. 2A to FIG. 2C, and FIG. 3A and FIG. 3B, according to one or some embodiments of the present invention, a system for detecting and cleaning air pollution in indoor space with heating, ventilation and air conditioning includes a heating, ventilation and air conditioning (HVAC) device, at least one outdoor gas detection device A0, a plurality of indoor gas detection devices A1, a plurality of filtering devices B, and a central controller C.

The HVAC device 1 is a common air conditioning mechanism for maintaining air-heating, air-cooling, and ventilation in the indoor space; that is, a modulation device for performing air-heating, air-cooling, and ventilation in the indoor space. As shown in FIG. 1B, at least one HVAC component, such as a heat pump, an air conditioner, a furnace, an air cleaner, a humidifier, an air scrubber, a dehumidifier, and any combination thereof (these are common air processing apparatuses, and not described in detail and not shown here), is modulated by using an HVAC device controller C2, for maintaining air-heating, air-cooling, and ventilation in the indoor space.

Figure 1A:
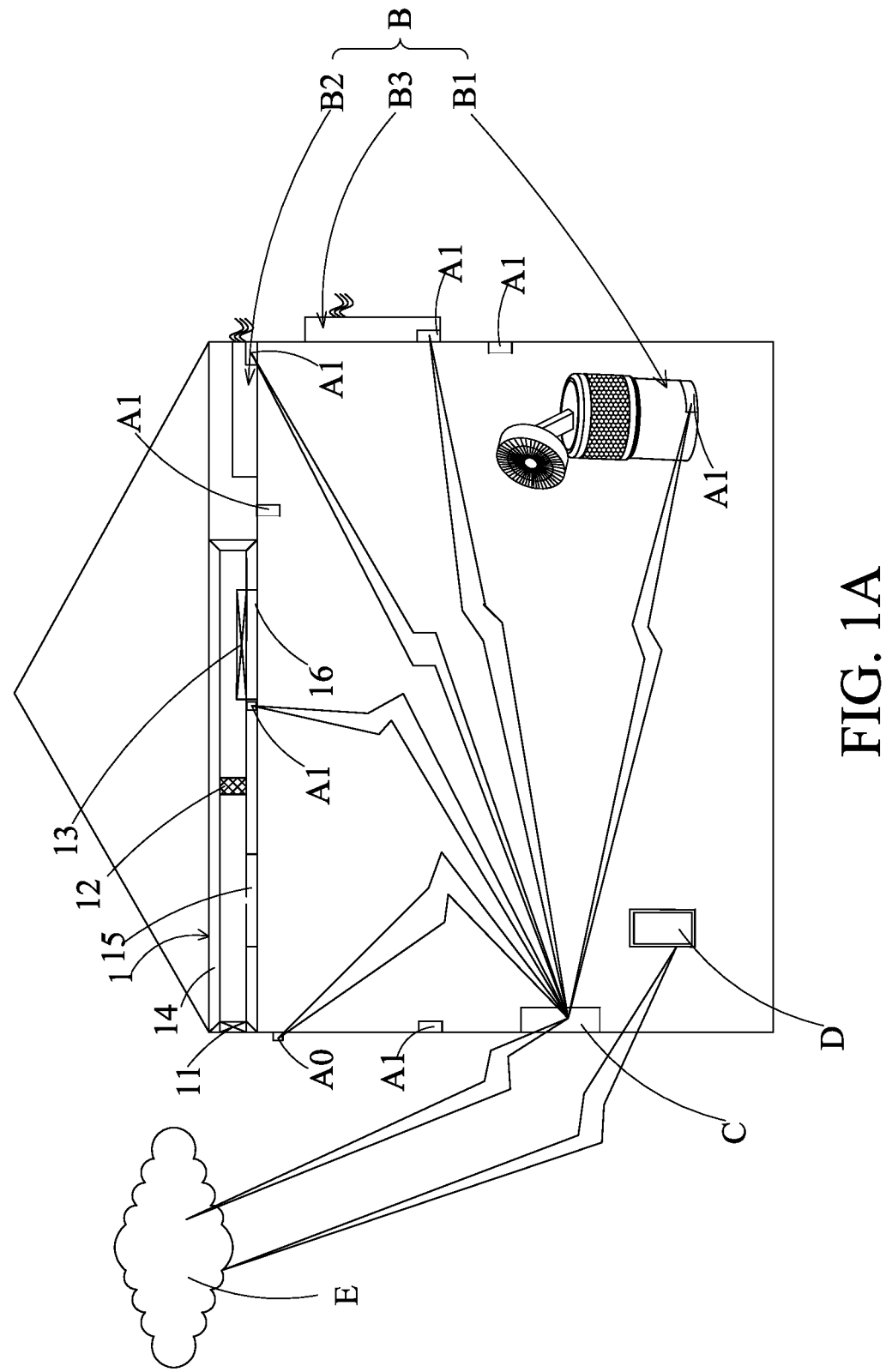
FIG. 1A illustrates a schematic view (1) showing the operation of a system for detecting and cleaning air pollution in indoor space with heating, ventilation and air conditioning of an exemplary embodiment in the present invention, wherein the system is utilized in an indoor space.
Figure 1B:
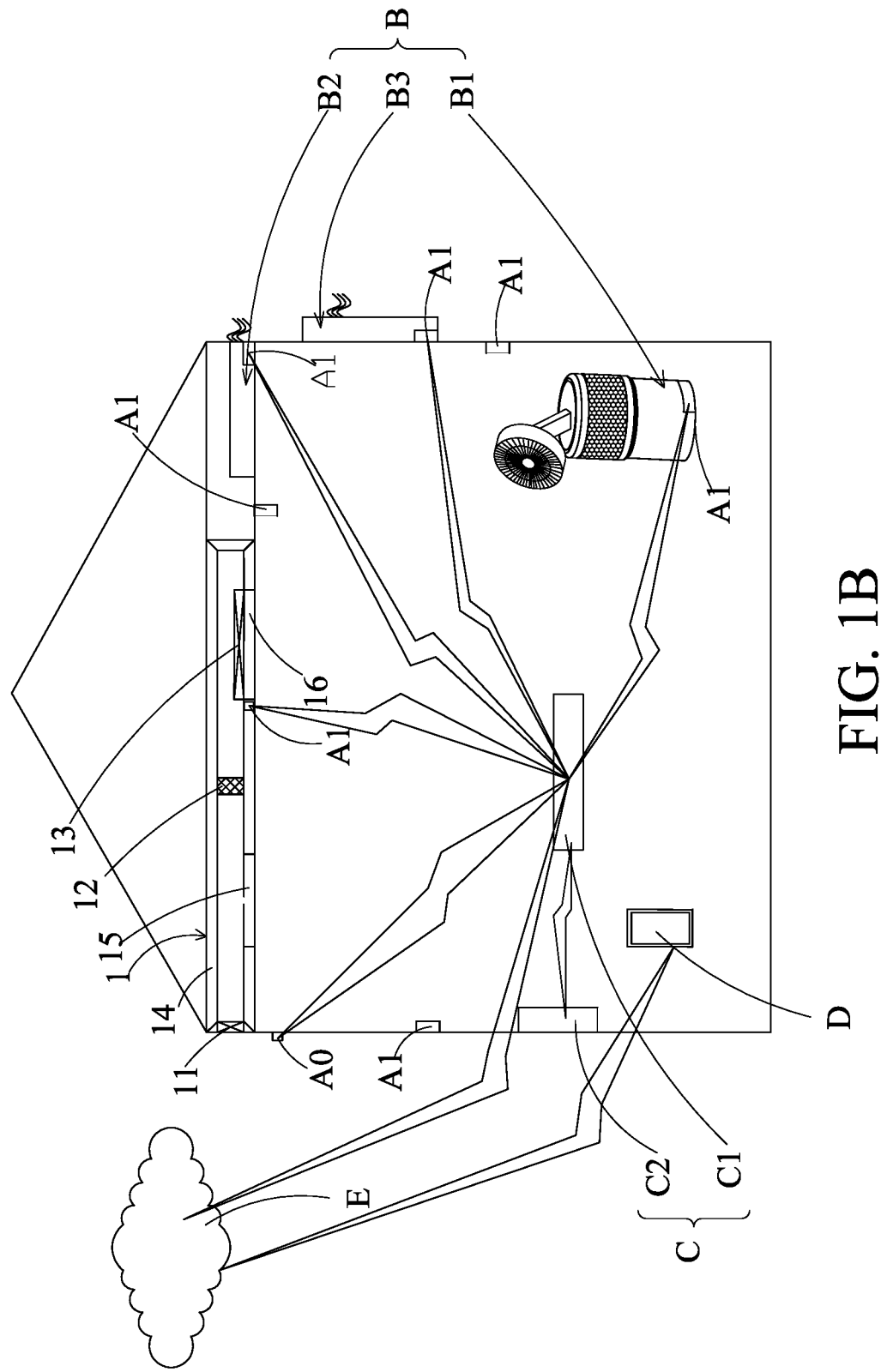
FIG. 1B illustrates a schematic view (2) showing the operation of the system for detecting and cleaning air pollution in indoor space with heating, ventilation and air conditioning of the exemplary embodiment in the present invention, wherein the system is utilized in the indoor space.
Figures 2A, 2B:
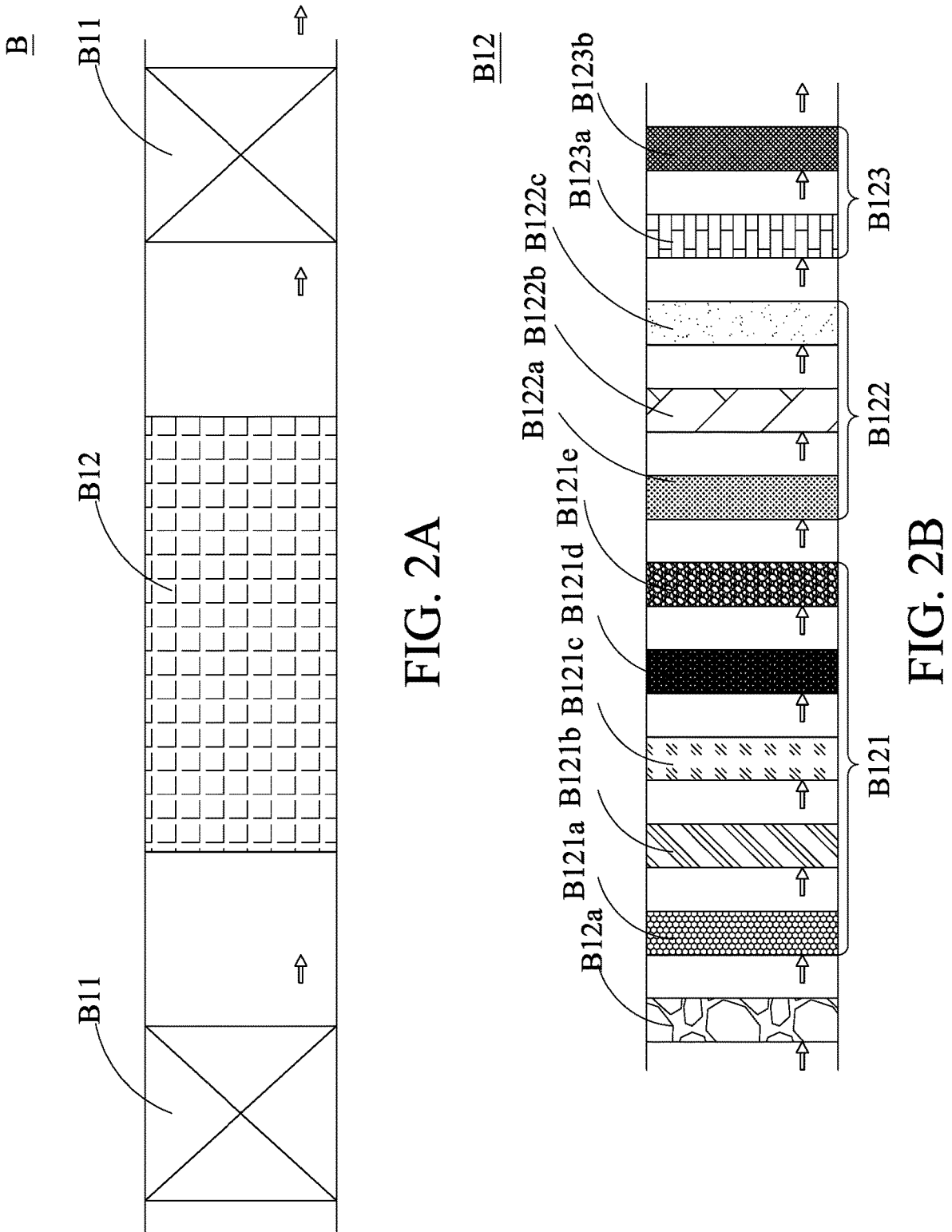
FIG. 2A illustrates a schematic view of a blower and a filtering component of the filtering device of the system for detecting and cleaning air pollution in indoor space with heating, ventilation and air conditioning of the exemplary embodiment in the present invention.
FIG. 2B illustrates a schematic view of the filtering component of the system for detecting and cleaning air pollution in indoor space with heating, ventilation and air conditioning of the exemplary embodiment in the present invention.
Figure 2C:
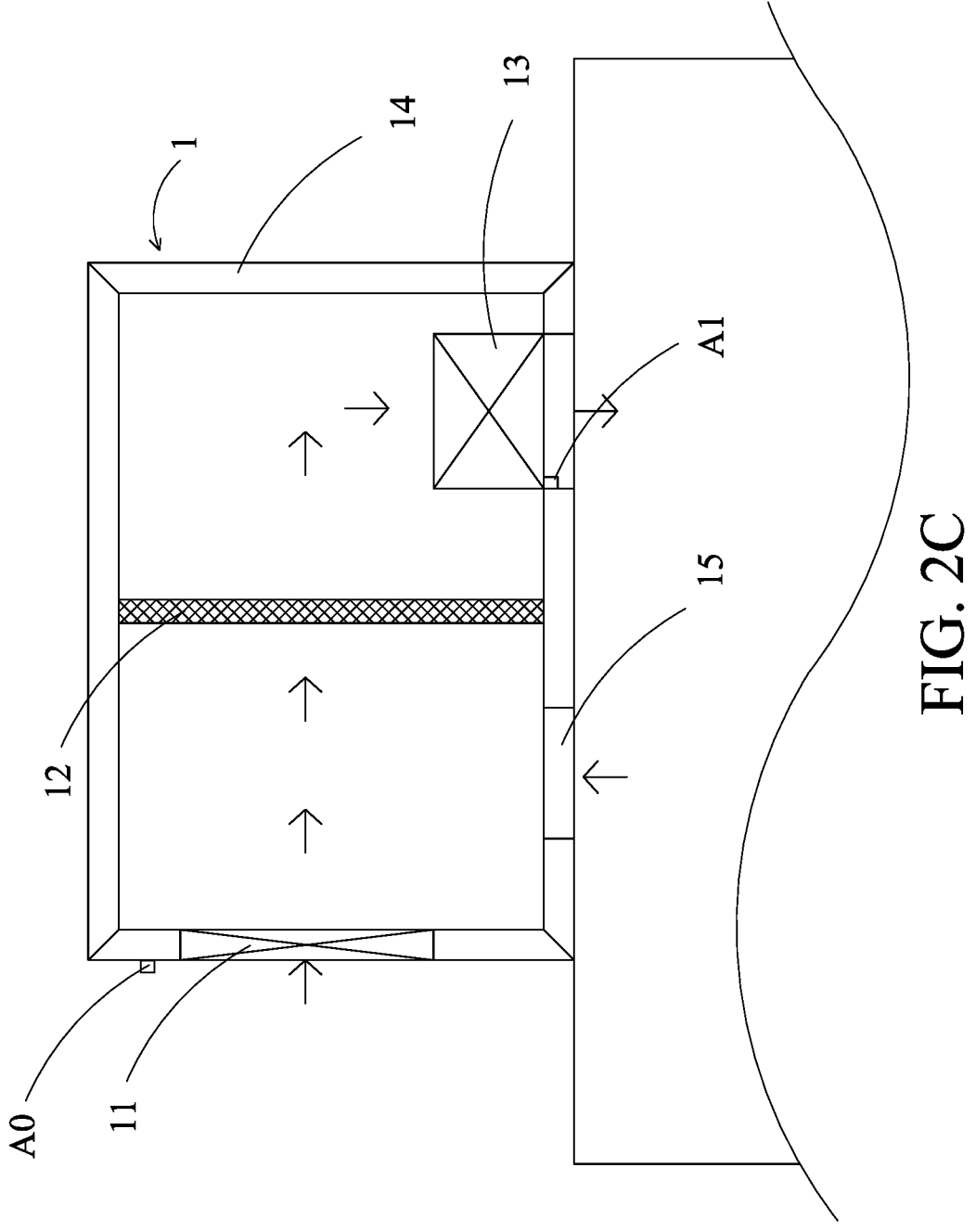
FIG. 2C illustrates a schematic view of the heating, ventilation and air conditioning device of the system for detecting and cleaning air pollution in indoor space with heating, ventilation and air conditioning of the exemplary embodiment in the present invention.

As shown in FIG. 1A and FIG. 2C, the HVAC device 1 comprises a gate 11, at least one channel filtering element 12, at least one flow-guiding device 13, a plurality of channels 14, and at least one HVAC component (not shown). The channels 14 are in communication with an indoor space. The gate 11 controls an external gas to be introduced into the indoor space, the flow-guiding device 13 guides the external gas into the channels 14, therefore the external gas is filtered by the at least one channel filtering element 12 and then introduced into the indoor space again. The at least one HVAC component provides an air conditioning modulation mechanism for performing air-heating, air-cooling, and ventilation in the indoor space. It should be noted that, in some embodiments, the channels 14 have a return inlet 15 adapted to introduce the indoor gas in the indoor space back into the channels 14 to make the circulative filtration. It should be noted that, in some embodiments, the flow-guiding device 13 may be a fan-type blower or a centrifugal-type blower. In one or some embodiments, the channel filtering element 12 is a high-efficiency particulate air (HEPA) filter, or the channel filtering element 12 is a filter having a minimum efficiency reporting value (MERV) 13 or higher.

As shown in FIG. 1A, the at least one outdoor gas detection device A0 is configured to detect a qualitative property and a concentration of an air pollution of an outdoor gas and transmit an outdoor air pollution data. It should be noted that, in the current embodiment, the number of the outdoor gas detection device A0 is one, but the present invention is not limited thereto; the number of the outdoor gas detection device A0 can be modified by the person in the art depending on practical scenarios.

Please refer to FIG. 1A, the indoor gas detection devices A1 are configured to detect a qualitative property and a concentration of an air pollution in the indoor space and output an indoor air pollution data. It should be noted that, in the present embodiment, the number of the indoor gas detection devices A1 is three, but the present invention is not limited thereto; the number of the indoor gas detection devices A1 can be modified by the person in the art depending on practical scenarios.

As shown in FIG. 1A, FIG. 2A, and FIG. 1B, the filtering devices B are disposed in the indoor space. Each of the filtering devices B comprises at least one blower B11 and at least one filtering component B12, wherein each of the filtering devices B is provided with a corresponding one of the indoor gas detection devices A1. It should be noted that, in this embodiment, the filtering devices B comprise at least one selected from the group consisting of a cleaning and filtering device B1, a ventilator B2, a cooker hood B3, and any combination thereof, but the present invention is not limited thereto; as long as the filtering device B comprises at least one blower B11 and at least one filtering component B12, the filtering device can be considered as an extended implementation of the filtering device B. Moreover, as shown in FIG. 2A, each of the filtering devices B comprises at least one blower B11 and at least one filtering component B12, wherein the blower 1 has the ability of transmitting the air bi-directionally, including the extraction and ejection. In the present embodiment, the arrow shown in the figures indicates the direction of the air flow. The blower B11 may be disposed in front of the filtering component B12 or behind the filtering component B12, also the blowers B11 may be disposed in front of and behind the filtering component B12 simultaneously. Accordingly, the blower B11 can be adjusted and modified according to any practical scenario by the person in the art.

It should be noted that, in some embodiments, as shown in FIG. 2B, the filtering component B12 of the filtering device B filters the air pollution physically by a filter to block and absorb the air pollution. In some embodiments, the filter is a high-efficiency particulate air filter B12a for absorbing the chemical smog, bacteria, dusts, particles, and pollens contained in the polluted gas, thereby the polluted gas introduced into the system can be filtered and purified. In one or some embodiments, the filtering component B12 of the filtering device B filters the air pollution chemically by applying a degradation layer B121 on the filtering component B12. In some embodiments, the degradation layer B121 may be an activated carbon B121a for filtering organic and inorganic substances and for filtering colored or odor substances. In some embodiments, the degradation layer B121 may be a cleansing factor layer B121b having chlorine dioxide for suppressing viruses, bacteria, fungus, influenza A virus, influenza B virus, Enterovirus, and Norovirus in the polluted gas introduced into the system. Accordingly, the suppressing rate may exceed 99%, allowing the reduction of the cross infections of the viruses. In some embodiments, the degradation layer B121 may be an herbal protection coating layer B121c including the extracts of *Rhus chinensis* Mill (may be *Rhus chinensis* Mill from Japan) and the extracts of *Ginkgo biloba* to efficiently perform anti-allergy function and destroy cell surface proteins of influenza viruses (e.g., influenza virus subtype H1N1). In some embodiments, the degradation layer B121 may be a layer of silver ions B121d for suppressing viruses, bacteria, and fungus in the polluted gas introduced into the system. In some embodiments, the degradation layer B121 may be a zeolite mesh B121e for removing ammonia, heavy metals, organic pollutants, *Escherichia coli*, phenol, chloroform, or anion surfactants. In some embodiments, the filtering component B12 filters the air pollution chemically along with a light illumination B122. In some embodiments, the light illumination B122 is a photocatalyst unit including a photocatalyst B122a and an ultraviolet light B122b. When the photocatalyst B122a is illuminated by the ultraviolet light B122b, the light energy is converted into electrical energy in order to degrade the hazardous matters in the polluted gas to achieve the effect of filtration and purification. In some embodiments, the light illumination B122 is a photo plasma unit including a nanometer light tube B122c. The introduced polluted gas is illuminated by the nanometer light tube B122c, making the oxygen molecules and water molecules in the polluted gas decompose into photo plasma with high oxidative power for generating a plasma flow which is capable of destroying the organic molecules. Accordingly, volatile organic compounds (VOC) such as formaldehyde and toluene in the polluted gas can be decomposed into water and carbon dioxide. In some embodiments, the filtering component B12 of the filtering device B filters the air pollution chemically along with a degradation unit B123. In some embodiments, the degradation unit B123 is a negative ion unit B123a; through applying high voltage discharging to the introduced polluted gas, the particulates carry with positive charges in the polluted gas are adhered to the negative charges on the negative ion unit B123a. In some embodiments, the degradation unit B123 is a plasma ion unit B123b; when the polluted gas is introduced into the system, the oxygen molecules and the water molecules in the polluted gas are ionized to generate cations ($H^+$) and anions ($O_2^-$). After the substances attached with water molecules around the ions attach on the surfaces of viruses and bacteria, the water molecules will be converted into oxidative oxygen ions (hydroxyl ions, $OH^-$ ions) with high oxidative power under chemical reaction, resulting in the oxidative oxygen ions take away the hydrogen ions of the proteins on the surfaces of the viruses and the bacteria so as to oxidize and decompose the viruses and bacteria. Therefore, the introduced gas can be filtered.

Figure 3A:
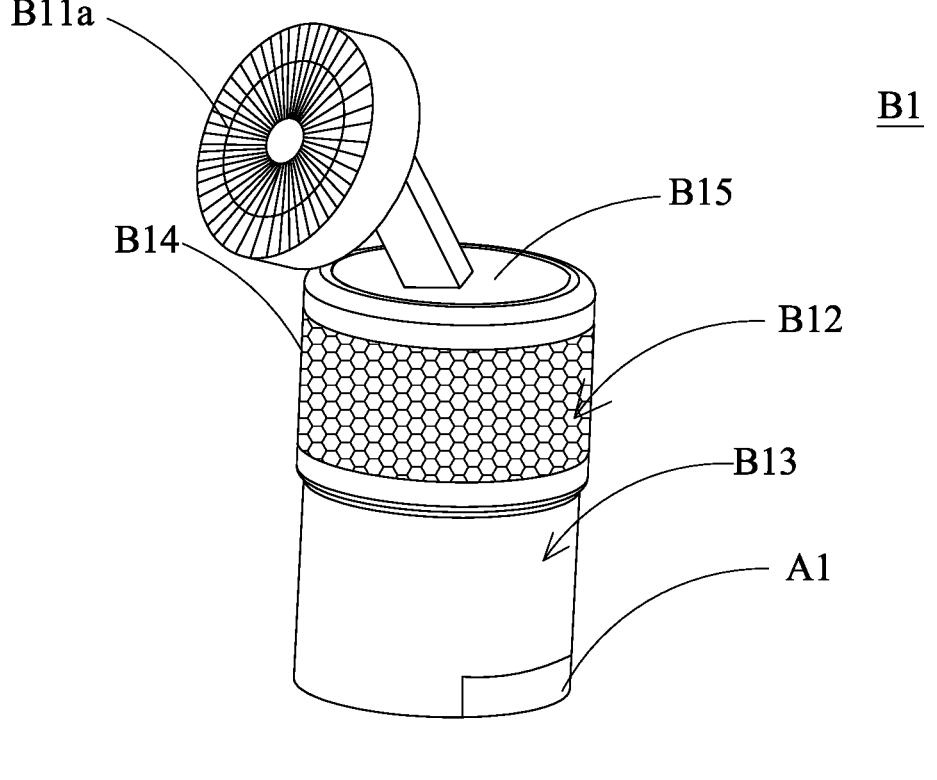
FIG. 3A illustrates a perspective view of a cleaning and filtering device of the system for detecting and cleaning air pollution in indoor space with heating, ventilation and air conditioning of the exemplary embodiment in the present invention.
Figure 3B:
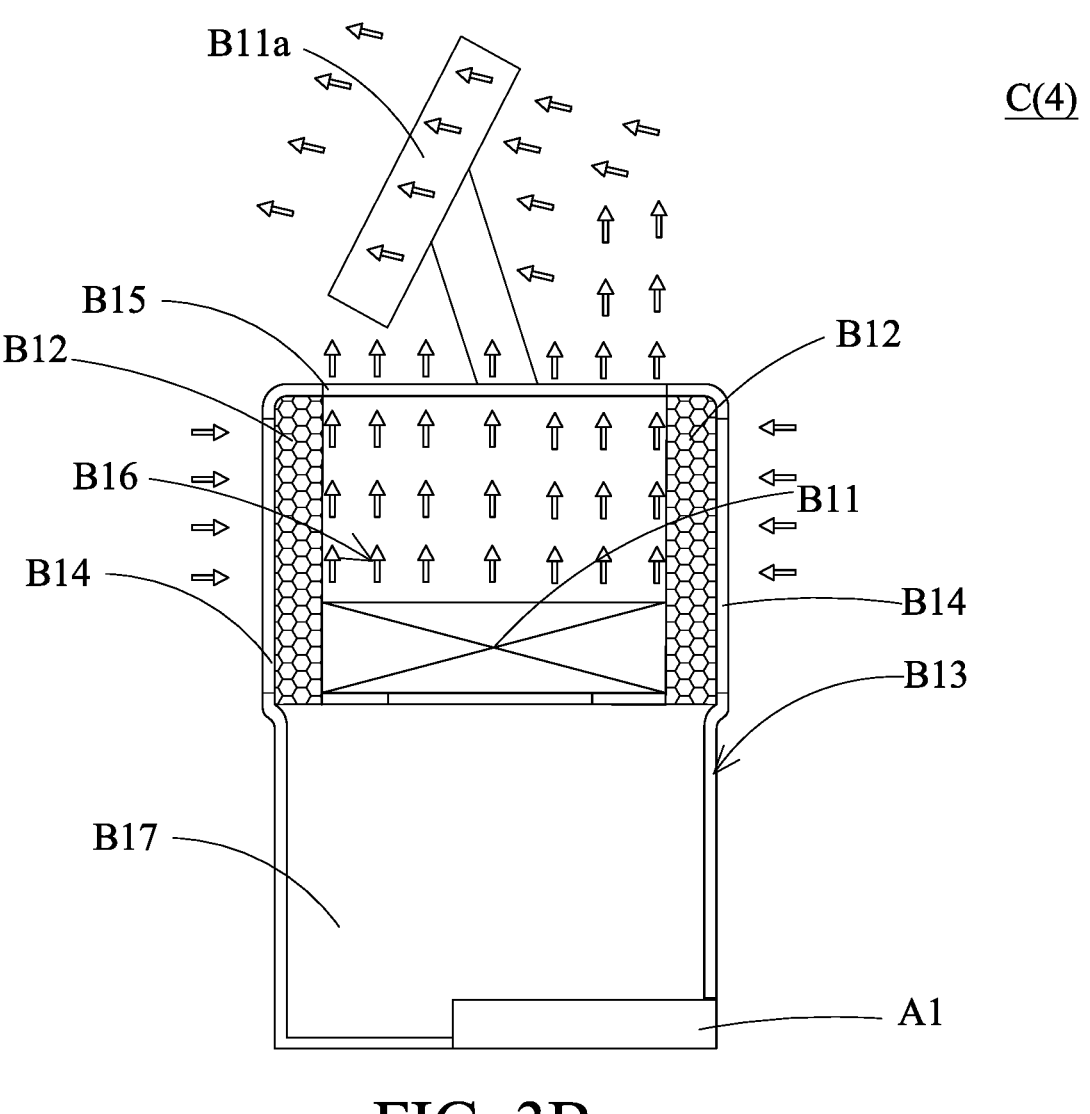
FIG. 3B illustrates a schematic cross-sectional view showing the relative positional relationship among the components of the cleaning and filtering device of the system for detecting and cleaning air pollution in indoor space with heating, ventilation and air conditioning of the exemplary embodiment in the present invention.
Figure 4A:
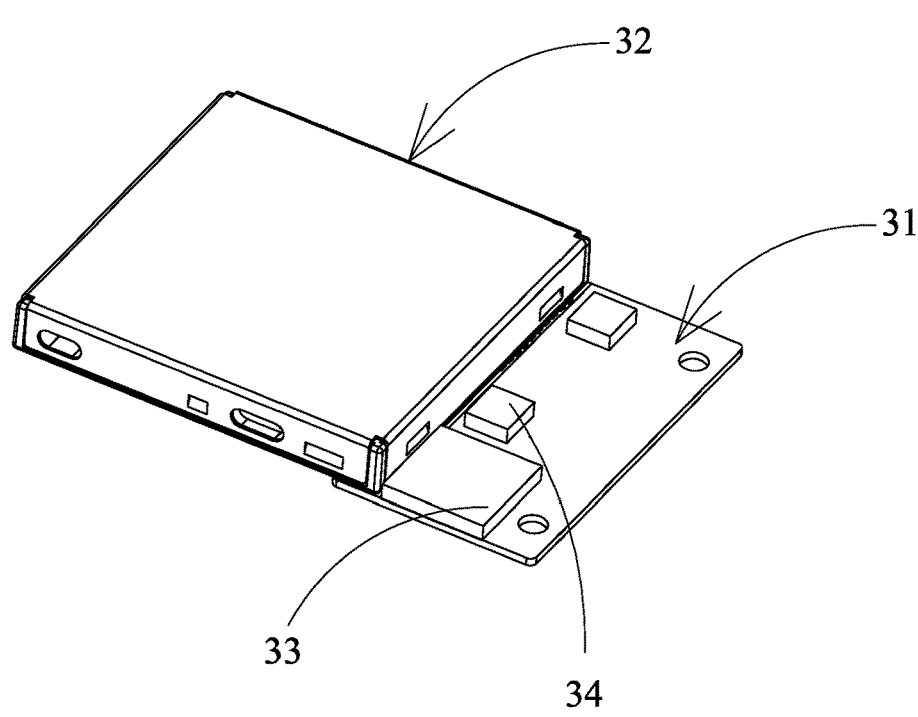
FIG. 4A illustrates a perspective view of a gas detection device of the system for detecting and cleaning air pollution in indoor space with heating, ventilation and air conditioning of the exemplary embodiment in the present invention.
Figure 4B:
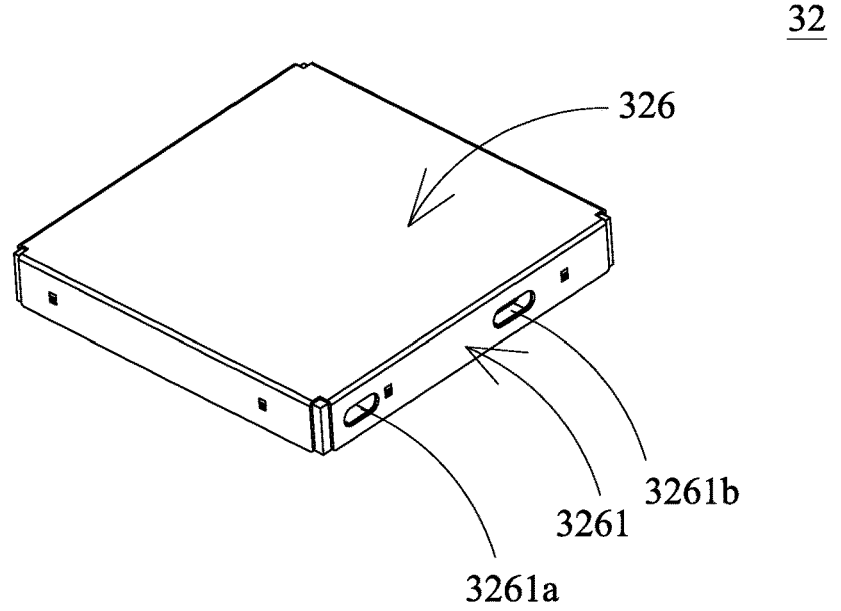
FIG. 4B illustrates a perspective view (1) of a gas detection main body of the system for detecting and cleaning air pollution in indoor space with heating, ventilation and air conditioning of the exemplary embodiment in the present invention.
Figure 4C:
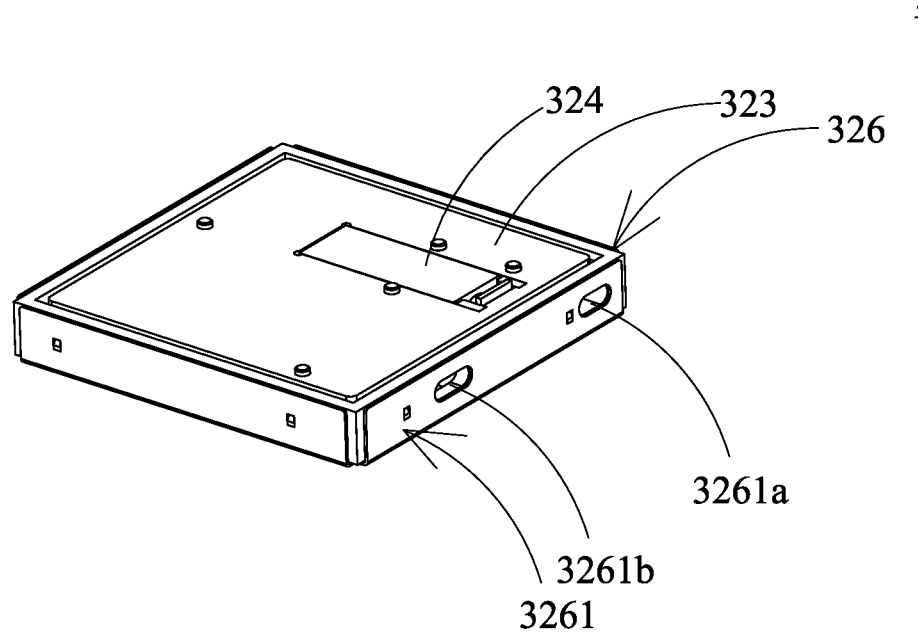
FIG. 4C illustrates a perspective view (2) of the gas detection main body of the system for detecting and cleaning air pollution in indoor space with heating, ventilation and air conditioning of the exemplary embodiment in the present invention.
Figure 4D:
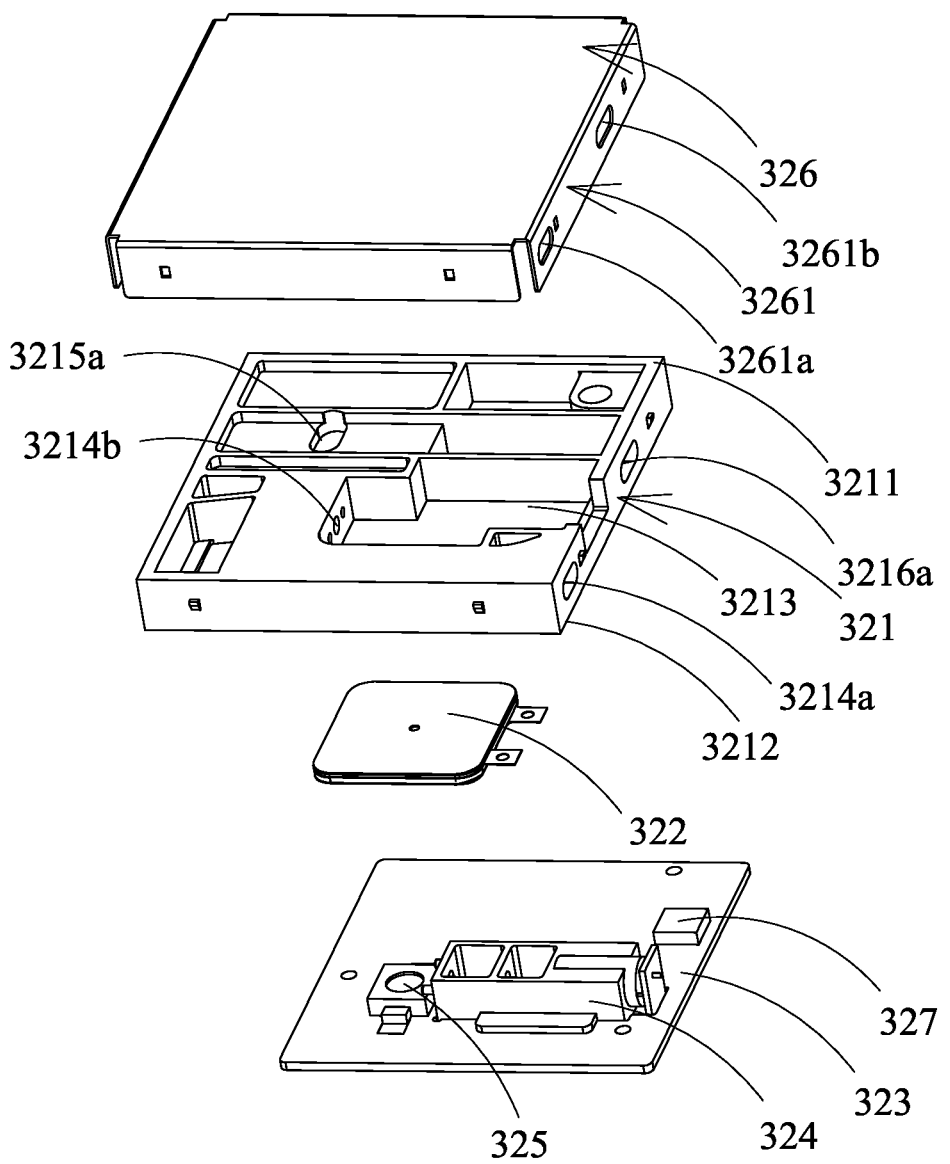
FIG. 4D illustrates an exploded view of the gas detection device of the system for detecting and cleaning air pollution in indoor space with heating, ventilation and air conditioning of the exemplary embodiment in the present invention.
Figure 5A:
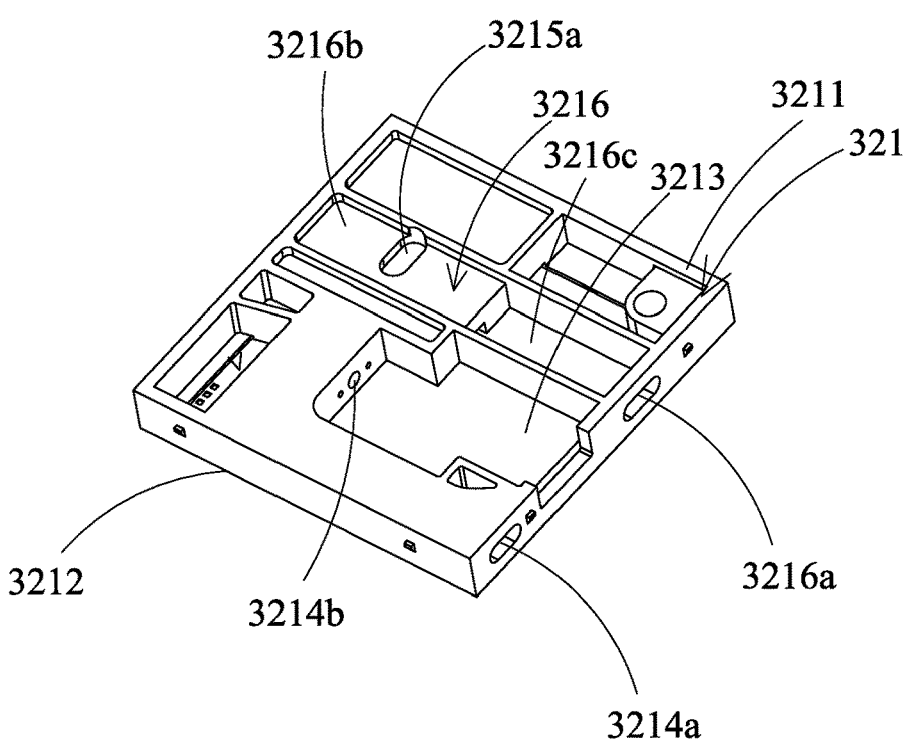
FIG. 5A illustrates a perspective view (1) of a base of the gas detection device of the system for detecting and cleaning air pollution in indoor space with heating, ventilation and air conditioning of the exemplary embodiment in the present invention.
Figure 5B:
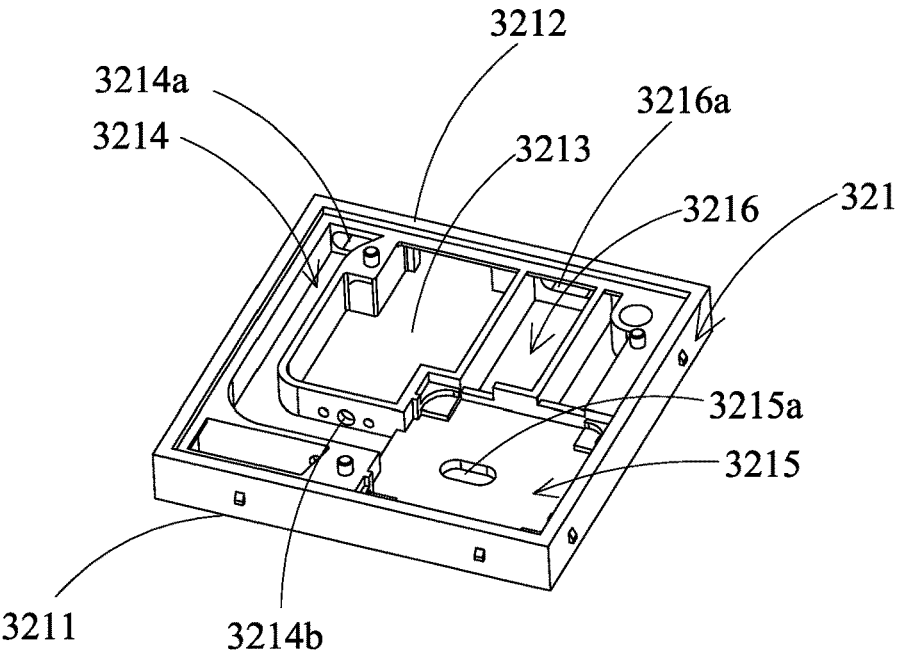
FIG. 5B illustrates a perspective view (2) of the base of the gas detection device of the system for detecting and cleaning air pollution in indoor space with heating, ventilation and air conditioning of the exemplary embodiment in the present invention.
Figure 6:
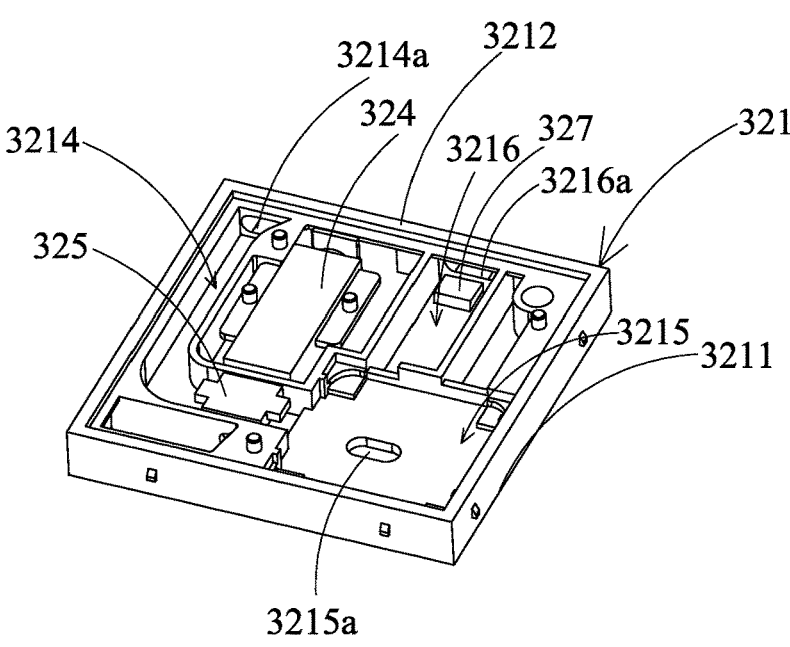
FIG. 6 illustrates a perspective view (3) of the base of the gas detection device of the system for detecting and cleaning air pollution in indoor space with heating, ventilation and air conditioning of the exemplary embodiment in the present invention.
Figure 7A:
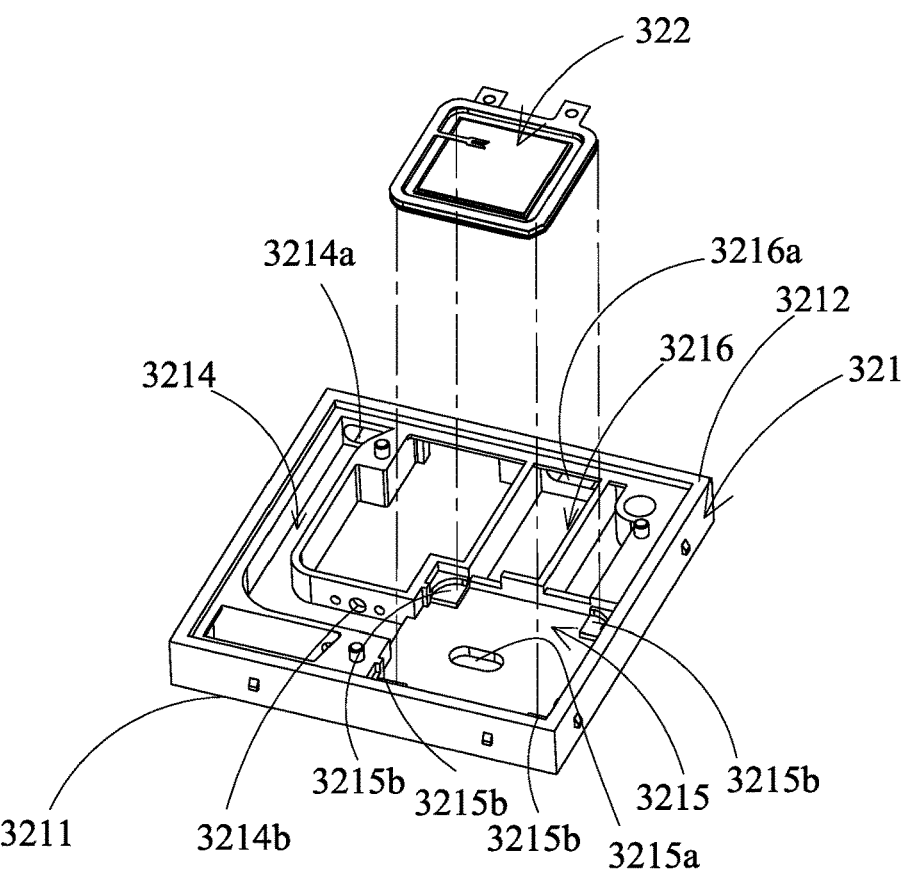
FIG. 7A illustrates an exploded view of a piezoelectric actuator separating from the base of the gas detection device of the system for detecting and cleaning air pollution in indoor space with heating, ventilation and air conditioning of the exemplary embodiment in the present invention.
Figure 7B:
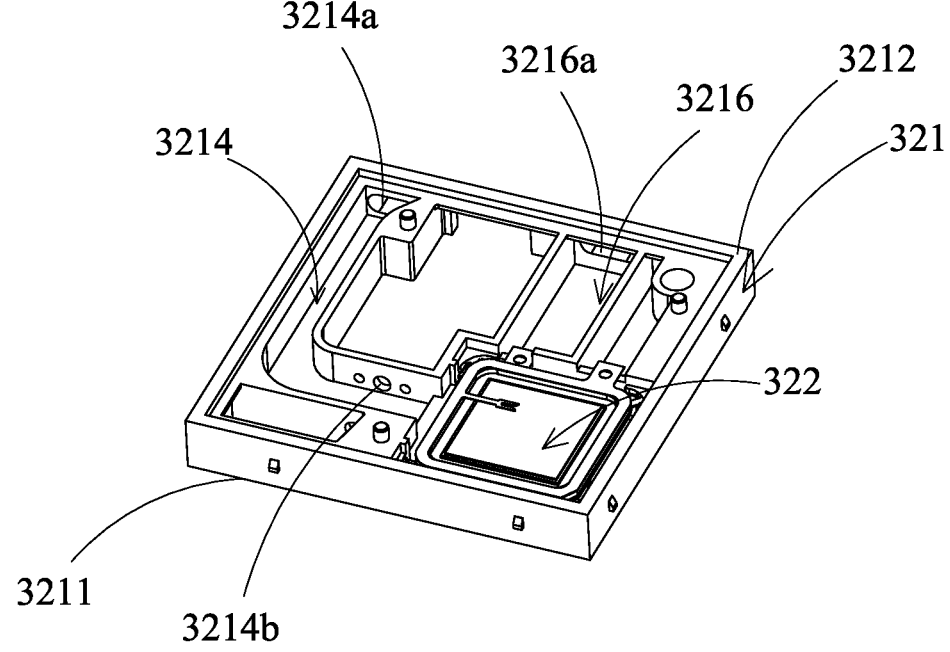
FIG. 7B illustrates a perspective view of the base in combination with the piezoelectric actuator of the gas detection device of the system for detecting and cleaning air pollution in indoor space with heating, ventilation and air conditioning of the exemplary embodiment in the present invention.
Figure 8A:
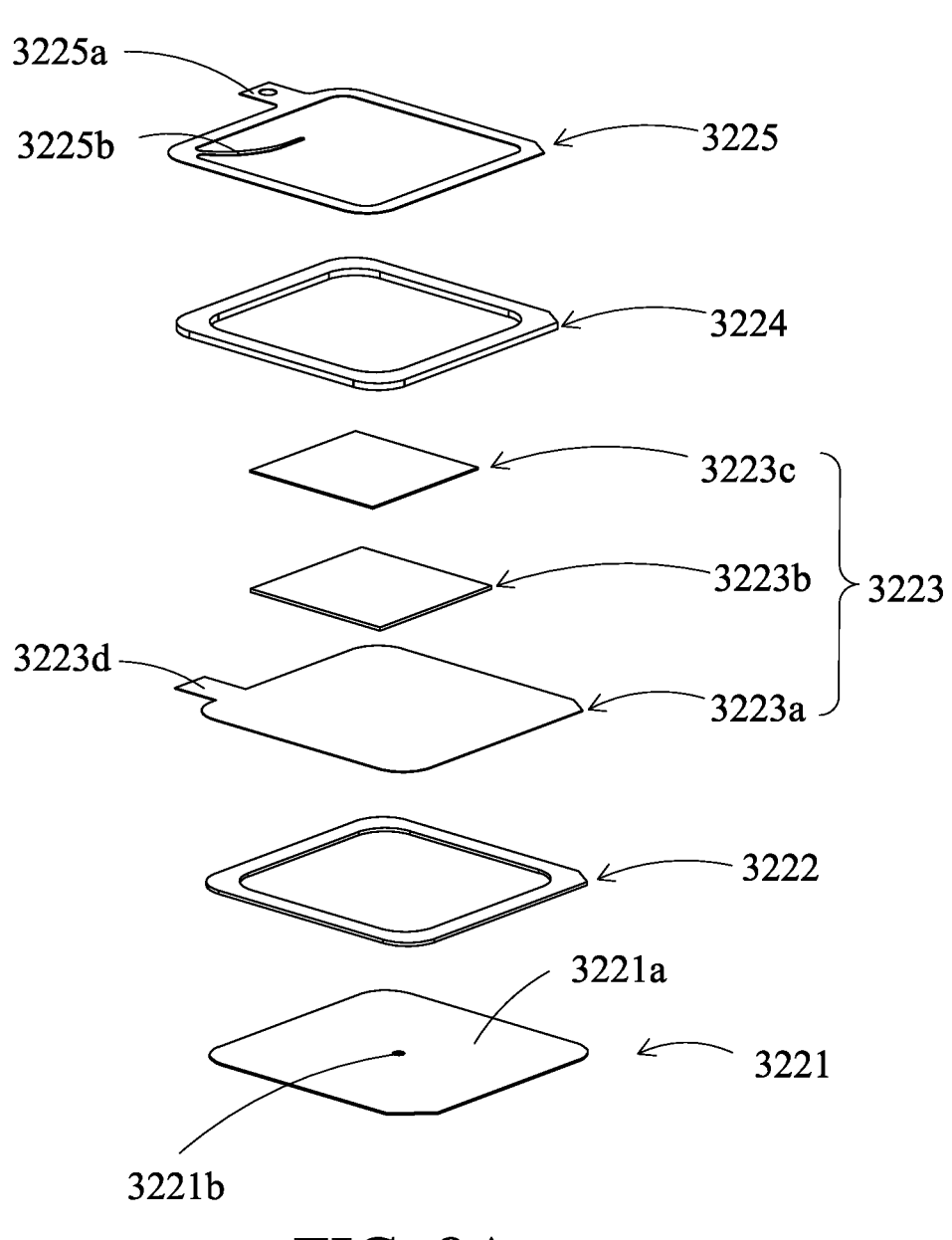
FIG. 8A illustrates an exploded view (1) of the piezoelectric actuator of the gas detection device of the system for detecting and cleaning air pollution in indoor space with heating, ventilation and air conditioning of the exemplary embodiment in the present invention.
Figure 8B:
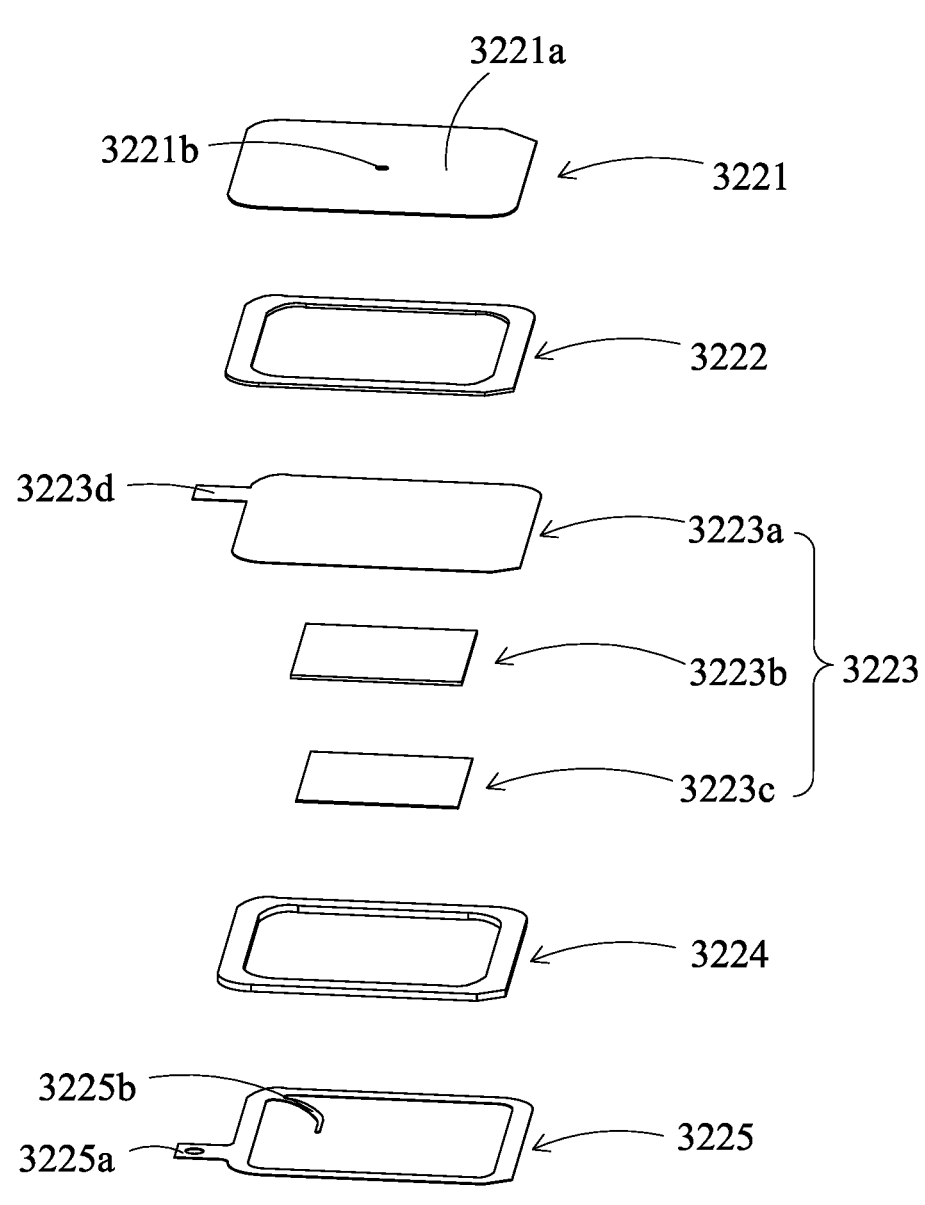
FIG. 8B illustrates an exploded view (2) of the piezoelectric actuator of the gas detection device of the system for detecting and cleaning air pollution in indoor space with heating, ventilation and air conditioning of the exemplary embodiment in the present invention.

Moreover, as shown in FIG. 3A and FIG. 3B, in the present embodiment, the cleaning and filtering device B1 is referred to a filtering device that can generate a directed air convection intelligently, and the cleaning and filtering device B1 includes a blower B11, a positioning and directional blower B11a, a filtering component B12, a main body B13, an inlet opening B14, an outlet opening B15, a gas passage B16, a power device B17, and an indoor gas detection device A1. Wherein the inlet opening B14, the outlet opening B15, and the gas passage B16 are disposed in the main body B13, the gas passage B16 is disposed between the inlet opening B14 and the outlet opening B15, and the filtering component B12 is disposed in the gas passage B16 to filter the air pollution guided into the gas passage B16. The blower B11 is disposed in the gas passage B16 and at the central portion of the filtering component B12 to guide the air pollution into the filtering component B12 from the inlet opening B14 to the outlet opening B15 for filtration and purification. The power device B17 is electrically connected to the blower B11, the positioning and directional blower B11a, and the indoor gas detection device A1 for providing the operation power for these components; alternatively, in some embodiments, the power device B17 may be connected to the supply mains. The positioning and directional blower B11a is configured on the main body B13 of the cleaning and filtering device B1 to guide the air convection, and the positioning and directional blower B11a is capable of being moved upwardly and downwardly, as well as rotating with respect to the cleaning and filtering device B1.

As shown in FIG. 1A, the central controller C is configured to receive the outdoor air pollution data detected by the at least one outdoor gas detection device A0 and the indoor air pollution data detected by the indoor gas detection devices A1, and the central controller C is configured to, by connecting to a cloud device E, perform an intelligent computation to locate an air pollution location in the indoor space. The cloud device E is configured to transmit a control command intelligently and selectively.

It should be noted that, the outdoor gas detection device A0 detects the qualitative property and the concentration of the air pollution of the outdoor gas and transmits the outdoor air pollution data to the central controller C. The indoor gas detection devices A1 detect the qualitative property and the concentration of the air pollution in the indoor space and output the indoor air pollution data to the central controller C. Then, the central controller C transmits the outdoor air pollution data and the indoor air pollution data to the cloud device E to perform an intelligent computation and comparison. If the indoor air pollution data is greater than the outdoor air pollution data, the cloud device E intelligently and selectively transmits the control command to the central controller C, and according to the control command, the central controller C controls the gate 11 of the HVAC device 1 to be opened and enables the flow-guiding device 13, so that the air pollution in the indoor space is discharged outside the indoor space rapidly, and the air pollution in the indoor space is filtered by the filtering component B12 of each of the filtering devices B and the gas in the indoor space is cleaned to the safe and breathable state.

It should be noted that, in this embodiment, each of the indoor gas detection devices A1 is disposed adjacent to a discharge outlet 16 of a corresponding one of the channels 14 of the HVAC device 1, so that the indoor gas detection devices A1 detect the qualitative property and the concentration of the air pollution of the external gas discharged by the channels 14 and filtered by the at least one filtering component B12 of each of the filtering devices B. Then, the indoor air pollution data detected by the indoor gas detection devices A1 are transmitted to the central controller C. Next, the central controller C transmits the outdoor air pollution data and the indoor air pollution data to the cloud device E to perform the intelligent computation and comparison. If the indoor air pollution data is less than the outdoor air pollution data, the cloud device E intelligently and selectively transmits the control command to the central controller C, and according to the control command, the central controller C controls the gate 11 of the HVAC device 1 to be closed so that the external gas is not introduced into the indoor space and controls the air conditioning modulation mechanism of the HVAC component for modulating air-heating, air-cooling, and ventilation in the indoor space, therefore the air pollution in the indoor space is filtered by the filtering component B12 of each of the filtering devices B and the gas in the indoor space is cleaned to the safe and breathable state.

In other words, through the intelligent computation and comparison, if the indoor air quality is better than the outdoor air quality, the central controller C closes the gate 11, so that the gas (air) in the indoor space flows into the return inlet 15, passes through the channel filtering component 12, and flows back into the indoor space through the flow-guiding device 13 again, thereby achieving the indoor circulation; if the outdoor air quality is better than the indoor air quality, the central controller C opens the gate 11, so that the external gas passes through the channel filtering component 12 and is introduced into the indoor space through the flow-guiding device 13 to achieve the gas exchange in the indoor space.

It should be noted that, in this embodiment, in the intelligent computation, the central controller C receives the outdoor air pollution data and the indoor air pollution data by connecting to the cloud device E, thus the cloud device E performs the intelligent computation and comparison (namely, in this embodiment, the cloud device E performs the artificial intelligent (AI) computation and big data comparison). According to one embodiment of the present invention, the cloud device E determines the air pollution location in the indoor space according to a highest data among the indoor air pollution data. According to one embodiment of the present invention, the cloud device E receives the indoor air pollution data detected by at least three of the indoor gas detection devices A1 to determine the air pollution location in the indoor space. After the cloud device E determines the air pollution location, the cloud device E intelligently and selectively transmits the control command to the central controller C, and the central controller C enables a filtering device B at the air pollution location (for example, the cleaning and filtering device B1) and rest of the filtering devices B which are outside the air pollution location (for example, the ventilator B2 and the cooker hood B3) respectively, enabling the filtering device B at the air pollution location to generate the air convection directed to the air pollution. The air convection accelerates the filtering of the air pollution at the air pollution location and the air pollution outside the air pollution location which is diffused, moved, and directed by the air convection, and the filtering components B12 of the rest of the filtering devices B outside the air pollution location are enabled intelligently and selectively, therefore the air pollution in the indoor space is filtered to allow the indoor air pollution data to be the safety detection value in which the air pollution data approaches to the non-detection state, and the gas in the indoor space is cleaned to the safe and breathable state.

In other words, in this embodiment, the filtering device B at the air pollution location is the cleaning and filtering device B1, and the directional blower B1a of the cleaning and filtering device B1 can provide an air convection with a certain direction according to the air pollution location, thereby accelerating the air pollution to be cleaned by the filtering component 2 of the cleaning and filtering device B1, and the air pollution can be cleaned by the filtering components B12 of the rest of the filtering devices B outside the air pollution location. Therefore, the air pollution in the indoor space is filtered to allow the indoor air pollution data to be the safety detection value in which the air pollution data approaches to the non-detection state, and the gas in the indoor space is cleaned to the safe and breathable state.

Accordingly, the central controller C is configured to receive the outdoor air pollution data and the indoor air pollution data, and the central controller C is configured to, by connecting to the cloud device E, perform the intelligent computation and comparison on the outdoor air pollution data and the indoor air pollution data to locate the air pollution location in the indoor space. The cloud device E is configured to transmit the control command intelligently and selectively. According to the control command received by the central controller C, the central controller C controls the gate 11 of the HVAC device 1 to be opened or closed so as to perform the gas exchange mechanism in the indoor space and to control the air conditioning modulation mechanism of the HVAC component. The indoor gas detection device A1 of the filtering device B receives the control command to enable the blower B11 so as to generate an air convection which is directed, thereby achieving the filtration of the air pollution by the filtering component B12 of the filtering device B to allow the indoor air pollution data to be the safety detection value in which the indoor air pollution data approaches to the non-detection state, and the gas in the indoor space is cleaned to the safe and breathable state.

For further definition of the air pollution (namely the polluted gas or polluted air) as mentioned in the above of embodiments, the air pollution may include at least one selected from the group consisting of particulate matters, carbon monoxide (CO), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, fungi, viruses, and any combination thereof. In some embodiments, the safety detection value includes a detection value in which the air pollution data approaches to almost zero. Alternatively, in some embodiments, the safety detection value includes at least one selected from the group consisting of a concentration of PM2.5 which is less than 15 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit per cubic meter of bacteria which is less than 1500 $CFU/m^3$, a colony-forming unit per cubic meter of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, a concentration of lead which is less than 0.15 $\mu g/m^3$, and any combination thereof.

It should be noted that, in this embodiment, the transmission of the outdoor air pollution data and the indoor air pollution data is implemented through a wireless communication, and the wireless communication is implemented by using one of a Wi-Fi module, a Bluetooth module, a radio-frequency identification module, and a near field communication module.

Certainly, as shown in FIG. 1A, the central controller C is an integrated controller capable of directly connecting to the cloud device E and directly receiving a data information and the control command from the cloud device E so as to directly control the gate 1 of the HVAC device and the air conditioning modulation mechanism of the HVAC component. Alternatively, as shown in FIG. 1B, in another embodiment, the central controller C comprises a main central controller C1 and an HVAC device controller C2. The main central controller C1 receives the data information and the control command from the cloud device E, and the HVAC device controller C2 receives the data information and the control command from the main central controller C1 through a wireless transmission, so that the control command is adapted to control the air conditioning modulation mechanism for performing air-heating, air-cooling, and ventilation in the indoor space. It should be noted that, in this embodiment, the HVAC device controller C2 comprises a display adapted to display the data information of the main central controller C1. It should be noted that, in this embodiment, the data information is an indoor/outdoor temperature and humidity, the indoor air pollution data, the outdoor air pollution data, or the information of an operation mechanism of the HVAC component.

Certainly, the system further comprises a mobile device D, the mobile device D receives the data information from the central controller C by connecting to the cloud device E, and the mobile device D displays the data information. It should be noted that, in this embodiment, the mobile device D is adapted to transmit the control command in order to control the central controller C for receiving the control command by connecting to the cloud device E, and control the indoor gas detection device A1 of the filtering device B to receive the control command to enable the blower B11 of the filtering device B so as to generate the air convection which is directed, thereby achieving the filtration of the air pollution by the filtering component B12 of the filtering device B to allow the indoor air pollution data to be the safety detection value in which the indoor air pollution data approaches to the non-detection state, and the gas in the indoor space is cleaned to the safe and breathable state.

To illustrate the embodiments of the present invention clearly, the detail structures of the outdoor gas detection device A0 and the indoor gas detection device A1 are illustrated as below.

Please refer to FIG. 4A to FIG. 11. According to one or some embodiments of the present invention, each of the outdoor gas detection device A0 and the indoor gas detection device A1 is a gas detection device, which would be indicated by reference number 3 in the descriptions below. The gas detection device 3 includes a control circuit board 31, a gas detection main body 32, a microprocessor 33, and a communication device 34. The gas detection main body 32, the microprocessor 33, and the communication device 34 are integrally packaged with the control circuit board 31 and electrically connected to each other. The microprocessor 33 and the communication device 34 are disposed on the control circuit board 31, and the microprocessor 33 controls a driving signal of the gas detection main body 32 to enable the operation of the gas detection main body 32, so that the gas detection main body 32 detects the air pollution and outputs a detection signal, and the microprocessor 33 receives the detection signal so as to compute, process, and output the air pollution data, therefore the microprocessor 33 provides the communication device 34 with the air pollution data for wirelessly transmitting outward.

Please refer to FIG. 4A to FIG. 9A. In one or some embodiments, the gas detection main body 32 includes a base 321, a piezoelectric actuator 322, a driving circuit board 323, a laser component 324, a particulate sensor 325, and an outer cover 326. The base 321 has a first surface 3211, a second surface 3212, a laser installation region 3213, a gas inlet groove 3214, a gas-guiding component installation region 3215, and a gas outlet groove 3216. The first surface 3211 and the second surface 3212 are opposite to each other. The laser installation region 3213 is formed by hollowing out the base 321 from the first surface 3211 to the second surface 3212 for accommodating the laser component 324. The outer cover 326 covers the base 321 and has a side plate 3261. The side plate 3261 has a gas inlet opening 3261a and a gas outlet opening 3261b. The gas inlet groove 3214 is recessed from the second surface 3212 and located adjacent to the laser installation region 3213. The gas inlet groove 3214 has a gas inlet through hole 3214a and two lateral walls. The gas inlet through hole 3214a is in communication with the outside environment of the base 321 and is corresponding to the gas inlet opening 3261a of the outer cover 326. Two light penetration windows 3214b penetrate the two lateral walls of the gas inlet groove 3214 and are in communication with the laser installation region 3213. Therefore, when the first surface 3211 of the base 321 is covered by the outer cover 326, and the second surface 3212 of the base 321 is covered by the driving circuit board 323, a gas inlet path can be defined by the gas inlet groove 3214.

The gas-guiding component installation region 3215 is recessed from the second surface 3212 and in communication with the gas inlet groove 3214. A ventilation hole 3215a penetrates a bottom surface of the gas-guiding component installation region 3215. Each of the four corners of the gas-guiding component installation region 3215 has a positioning bump 3215b. The gas outlet groove 3216 has a gas outlet through hole 3216a, and the gas outlet through hole 3216a is corresponding to the gas outlet opening 3261b of the outer cover 326. The gas outlet groove 3216 includes a first region 3216b and a second region 3216c. The first region 3216b is recessed from a portion of the first surface 3211 corresponding to a vertical projection region of the gas-guiding component installation region 3215. The second region 3216c is at a portion extending from a region that is not corresponding to the vertical projection region of the gas-guiding component installation region 3215, and the second region 3216c is hollowed out from the first surface 3211 to the second surface 3212. The first region 3216b is connected to the second region 3216c to form a stepped structure. Moreover, the first region 3216b of the gas outlet groove 3216 is in communication with the ventilation hole 3215a of the gas-guiding component installation region 3215, and the second region 3216c of the gas outlet groove 3216 is in communication with the gas outlet through hole 3216a. Therefore, when the first surface 3211 of the base 321 is covered by the outer cover 326 and the second surface 3212 of the base 321 is covered by the driving circuit board 323, a gas outlet path can be defined by the gas outlet groove 3216 and the driving circuit board 323.

Furthermore, the laser component 324 and the particulate sensor 325 are disposed on the driving circuit board 323 and located in the base 321. The laser component 324 and the particulate sensor 325 are electrically connected to the driving circuit board 323. It should notice that the driving circuit board 323 is omitted to clearly explain the positions of the laser component 324, the particulate sensor 325, and the base 321. In the embodiment of the present invention, the laser component 324 is located at the laser installation region 3213 of the base 321. The particulate sensor 325 is located at the gas inlet groove 3214 of the base 321 and aligned with the laser component 324. Moreover, the laser component 324 is corresponding to the light penetration windows 3214b so as to allow the light beam emitted by the laser component 324 to pass therethrough and into the gas inlet groove 3214. The light path of the light beam emitted by the laser component 324 passes through the light penetration windows 3214b and is orthogonal to the gas inlet groove 3214. The light beam emitted by the laser component 324 passes into the gas inlet groove 3214 through the light penetration windows 3214*b*, thereby the particulate matters in the gas inlet groove 3214 is illuminated by the light beam. When the light beam contacts the gas, the light beam will be scattered and generate light spots. Hence, the light spots generated by the scattering are received and calculated by the particulate sensor 325 located at the position orthogonal to the gas inlet groove 3214 to obtain the detection data of the gas. Furthermore, a gas sensor 327 is disposed on the driving circuit board 323 and is located at the gas outlet groove 3216 for detecting the polluted gas introduced into the gas outlet groove 3216, and the gas sensor 327 is electrically connected to the driving circuit board 323. In one embodiment of the present invention, the gas sensor 327 includes at least one selected from the group consisting of a volatile organic compound detector capable of detecting gas information of carbon dioxide ($CO_2$) or total volatile organic compounds (TVOC), a formaldehyde sensor capable of detecting gas information of formaldehyde (HCHO) gas, a bacterial sensor capable of detecting information of bacteria or fungi, and a virus sensor capable of detecting information of viruses, and any combination thereof.

Moreover, the piezoelectric actuator 322 is located at the square-shaped gas-guiding component installation region 3215 of the base 321, and the gas-guiding component installation region 3215 is in communication with the gas inlet groove 3214. When the piezoelectric actuator 322 is enabled, the gas in the gas inlet groove 3214 is inhaled into the piezoelectric actuator 322, passing through the ventilation hole 3215*a* of the gas-guiding component installation region 3215, and entering the gas outlet groove 3216. Moreover, the driving circuit board 323 covers the second surface 3212 of the base 321. The laser component 324 and the particulate sensor 325 are disposed on the driving circuit board 323 and electrically connected to the driving circuit board 323. As the outer cover 326 covers the base 321, the gas inlet opening 3261*a* is corresponding to the gas inlet through hole 3214*a* of the base 321, and the gas outlet opening 3216*b* is corresponding to the gas outlet through hole 3216*a* of the base 321.

Furthermore, the piezoelectric actuator 322 includes a nozzle plate 3221, a chamber frame 3222, an actuation body 3223, an insulation frame 3224, and a conductive frame 3225. The nozzle plate 3221 is made by a flexible material and has a suspension sheet 3221*a* and a hollow hole 3221*b*. The suspension sheet 3221*a* is a flexible sheet which can bend and vibrate. The shape and the size of the suspension sheet 3221*a* approximately corresponding to the inner edge of the gas-guiding component installation region 3215. The hollow hole 3221*b* penetrates through the center portion of the suspension sheet 3221*a* for the gas flowing therethrough. In one embodiment of the present invention, the shape of the suspension sheet 3221*a* can be selected from square, circle, ellipse, triangle, or polygon.

Furthermore, the chamber frame 3222 is stacked on the nozzle plate 3221, and the shape of the chamber frame 3222 is corresponding to the shape of the nozzle plate 3221. The actuation body 3223 is stacked on the chamber frame 3222. A resonance chamber 3226 is collectively defined between the actuation body 3223, the chamber frame 3222, and the suspension sheet 3221*a*. The insulation frame 3224 is stacked on the actuation body 3223. The appearance of the insulation frame 3224 is similar to the appearance of the chamber frame 3222. The conductive frame 3225 is stacked on the insulation frame 3224. The appearance of the conductive frame 3225 is similar to the appearance of the insulation frame 3224. The conductive frame 3225 has a conductive pin 3225*a* and a conductive electrode 3225*b*. The conductive pin 3225*a* extends outwardly from the outer edge of the conductive frame 3225, and the conductive electrode 3225*b* extends inwardly from the inner edge of the conductive frame 3225. Moreover, the actuation body 3223 further includes a piezoelectric carrying plate 3223*a*, an adjusting resonance plate 3223*b*, and a piezoelectric plate 3223*c*. The piezoelectric carrying plate 3223*a* is stacked on the chamber frame 3222, and the adjusting resonance plate 3223*b* is stacked on the piezoelectric carrying plate 3223*a*. The piezoelectric plate 3223*c* is stacked on the adjusting resonance plate 3223*b*. The adjusting resonance plate 3223*b* and the piezoelectric plate 3223*c* are accommodated in the insulation frame 3224. The conductive electrode 3225*b* of the conductive frame 3225 is electrically connected to the piezoelectric plate 3223*c*. In one preferred embodiment of the present invention, the piezoelectric carrying plate 3223*a* and the adjusting resonance plate 3223*b* are both made of conductive material(s). The piezoelectric carrying plate 3223*a* has a piezoelectric pin 3223*d*. The piezoelectric pin 3223*d* and the conductive pin 3225*a* are in electrical connection with a driving circuit (not shown) of the driving circuit board 323 to receive a driving signal (which may be a driving frequency and a driving voltage). The piezoelectric pin 3223*d*, the piezoelectric carrying plate 3223*a*, the adjusting resonance plate 3223*b*, the piezoelectric plate 3223*c*, the conductive electrode 3225*b*, the conductive frame 3225, and the conductive pin 3225*a* may together generate an electrical circuit for transmitting the driving signal, and the insulation frame 3224 is provided for electrically insulating the conductive frame 3225 from the actuation body 3223 to avoid short circuit, thereby the driving signal can be transmitted to the piezoelectric plate 3223*c*. When the piezoelectric plate 3223*c* receives the driving signal, the piezoelectric plate 3223*c* deforms owing to the piezoelectric effect, and thus the piezoelectric carrying plate 3223*a* and the adjusting resonance plate 3223*b* are driven to vibrate in a reciprocating manner.

Moreover, the adjusting resonance plate 3223*b* is disposed between the piezoelectric plate 3223*c* and the piezoelectric carrying plate 3223*a* as a buffering element so as to adjust the vibration frequency of the piezoelectric carrying plate 3223*a*. Generally, the thickness of the adjusting resonance plate 3223*b* is greater than the thickness of the piezoelectric carrying plate 3223*a*. The thickness of the adjusting resonance plate 3223*b* may be modified to adjust the vibration frequency of the actuation body 3223.

Please refer to FIG. 7A, FIG. 7B, FIG. 8A, FIG. 8B, and FIG. 9A. The nozzle plate 3221, the chamber frame 3222, the actuation body 3223, the insulation frame 3224, and the conductive frame 3225 are sequentially stacked and assembled and are positioned in the gas-guiding component installation region 3215, thereby a clearance 3221*c* is defined between the suspension sheet 3221*a* and the inner edge of the gas-guiding component installation region 3215 for the gas to pass therethrough. A gas flow chamber 3227 is formed between the nozzle plate 3221 and the bottom surface of the gas-guiding component installation region 3215. The gas flow chamber 3227 is in communication with the resonance chamber 3226 formed between the actuation body 3223, the chamber frame 3222, and the suspension sheet 3221*a* through the hollow hole 3221*b* of the nozzle plate 3221. In one aspect of the present invention, the resonance chamber 3226 and the suspension sheet 3221*a* can generate the Helmholtz resonance effect to improve the transmission efficiency of the gas through controlling the vibration frequency of the gas in the resonance chamber 3226 to be close to the vibration frequency of the suspension sheet 3221a. When the piezoelectric plate 3223c moves in a direction away from the bottom surface of the gas-guiding component installation region 3215, the piezoelectric plate 3223c drives the suspension sheet 3221a of the nozzle plate 3221 to move in the direction away from the bottom surface of the gas-guiding component installation region 3215 correspondingly. Hence, the volume of the gas flow chamber 3227 expands dramatically, therefore the internal pressure of the gas flow chamber 3227 decreases and creates a negative pressure, drawing the gas outside the piezoelectric actuator 322 to flow into the piezoelectric actuator 322 through the clearance 3221c and enter the resonance chamber 3226 through the hollow hole 3221b, thereby increasing the gas pressure of the resonance chamber 3226 and thus generating a pressure gradient. When the piezoelectric plate 3223c drives the suspension sheet 3221a of the nozzle plate 3221 to move toward the bottom surface of the gas-guiding component installation region 3215, the gas inside the resonance chamber 3226 is pushed to flow out rapidly through the hollow hole 3221b to further push the gas inside the gas flow chamber 3227, thereby the converged gas can be rapidly and massively ejected out of the gas flow chamber 3227 through the ventilation hole 3215a of the gas-guiding component installation region 3215 in a state closing to an ideal gas state under the Bernoulli's law.

Figure 9A:
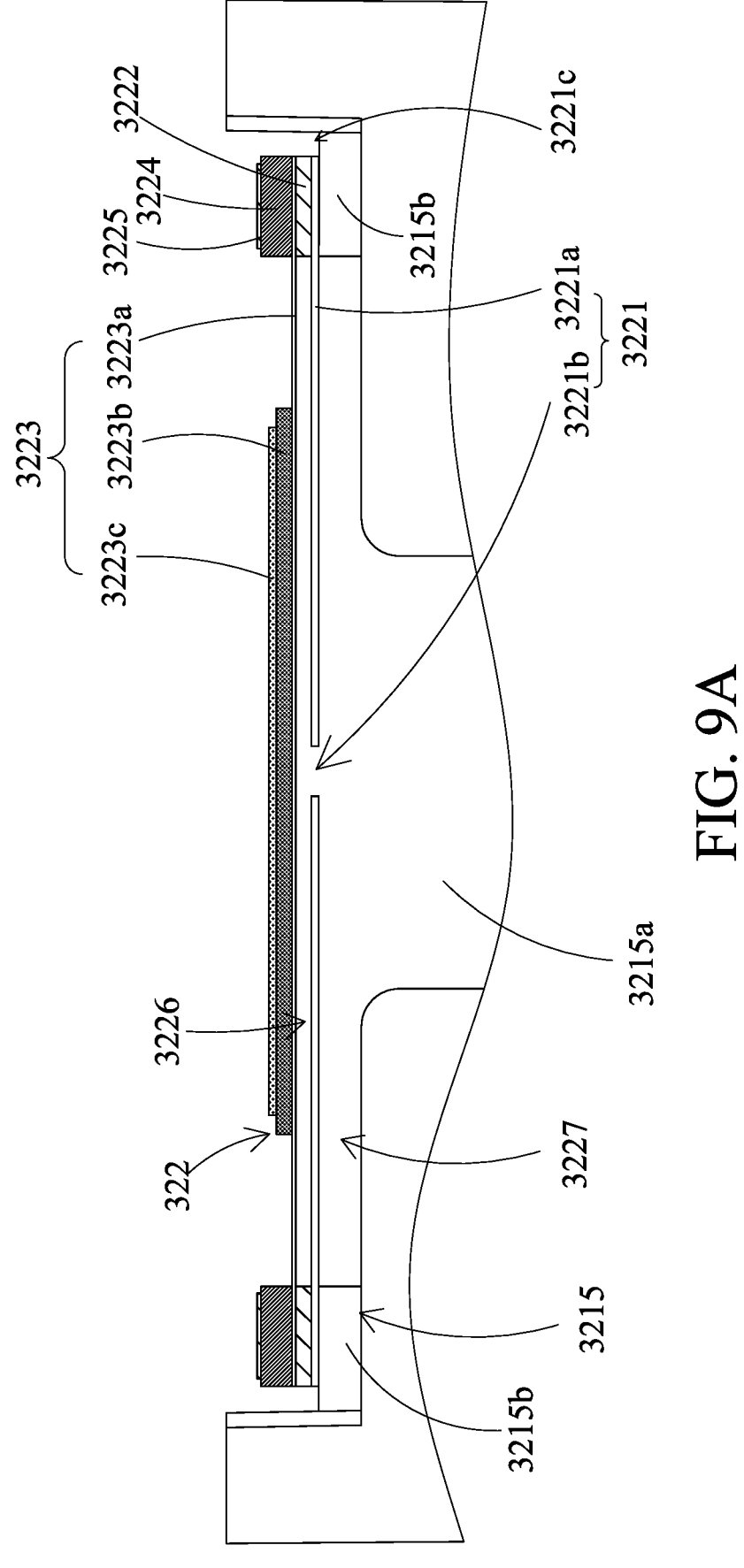
FIG. 9A illustrates a cross-sectional view (1) showing the operation of the piezoelectric actuator of the gas detection device of the system for detecting and cleaning air pollution in indoor space with heating, ventilation and air conditioning of the exemplary embodiment in the present invention.
Figure 9B:
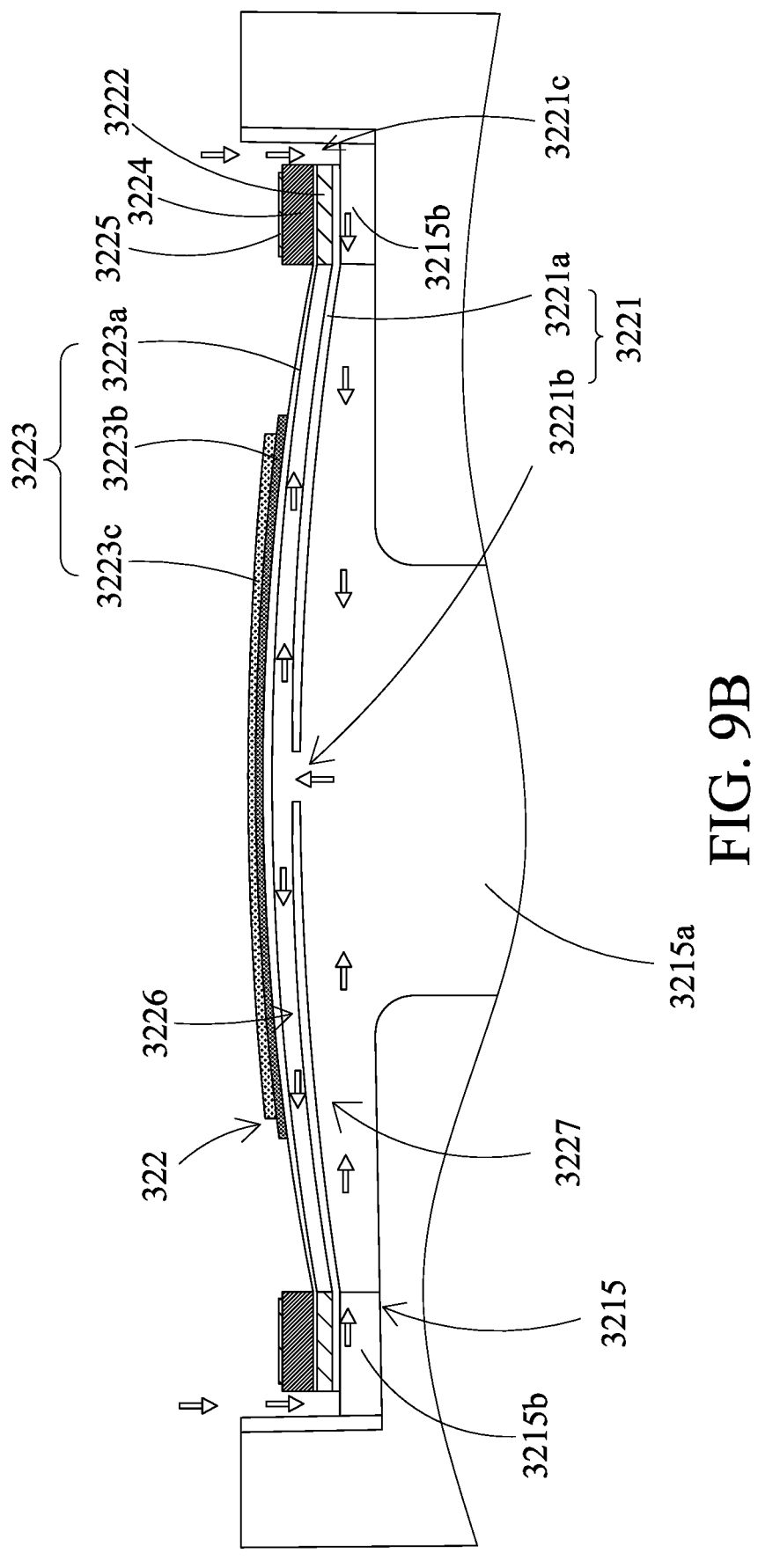
FIG. 9B illustrates a cross-sectional view (2) showing the operation of the piezoelectric actuator of the gas detection device of the system for detecting and cleaning air pollution in indoor space with heating, ventilation and air conditioning of the exemplary embodiment in the present invention.
Figure 9C:
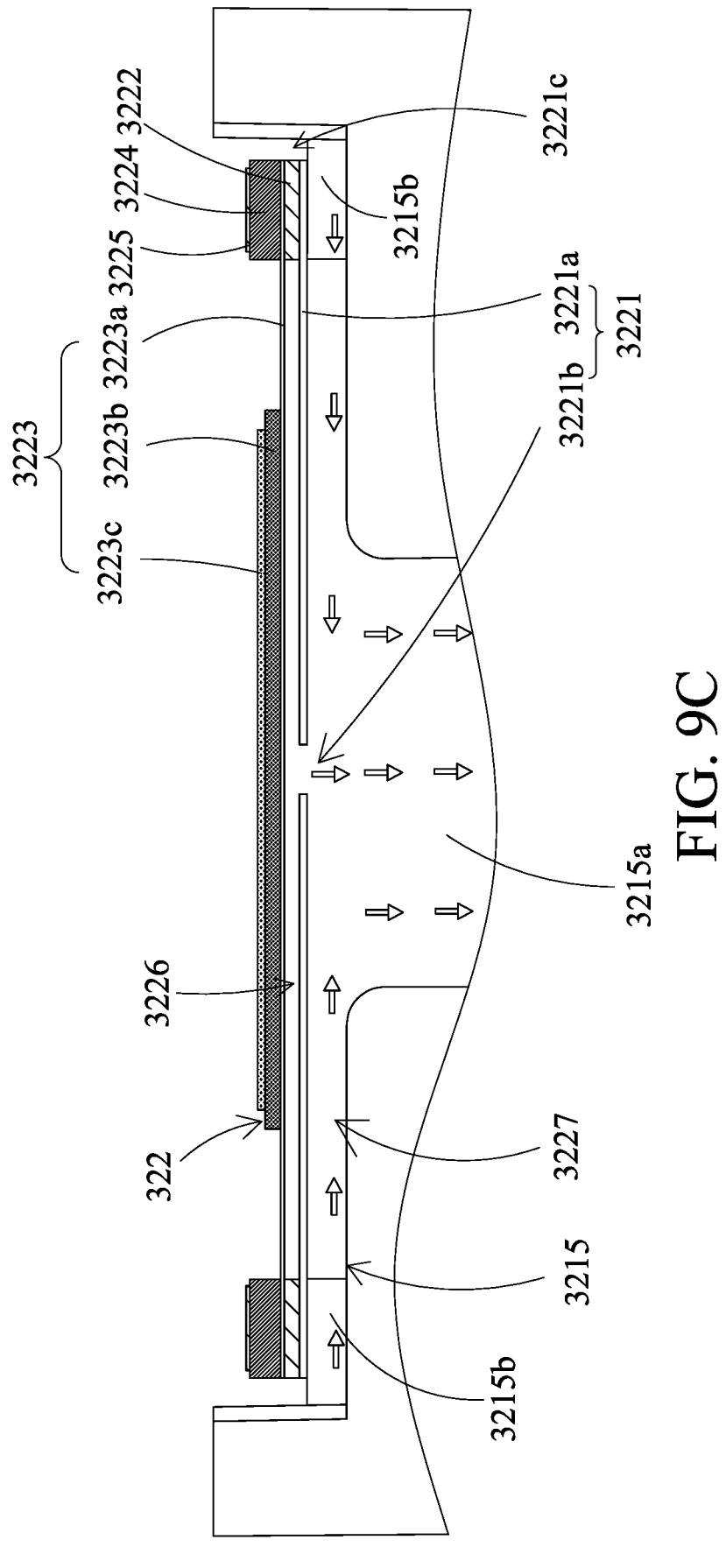
FIG. 9C illustrates a cross-sectional view showing the operation (3) of the piezoelectric actuator of the gas detection device of the system for detecting and cleaning air pollution in indoor space with heating, ventilation and air conditioning of the exemplary embodiment in the present invention.
Figure 10A:
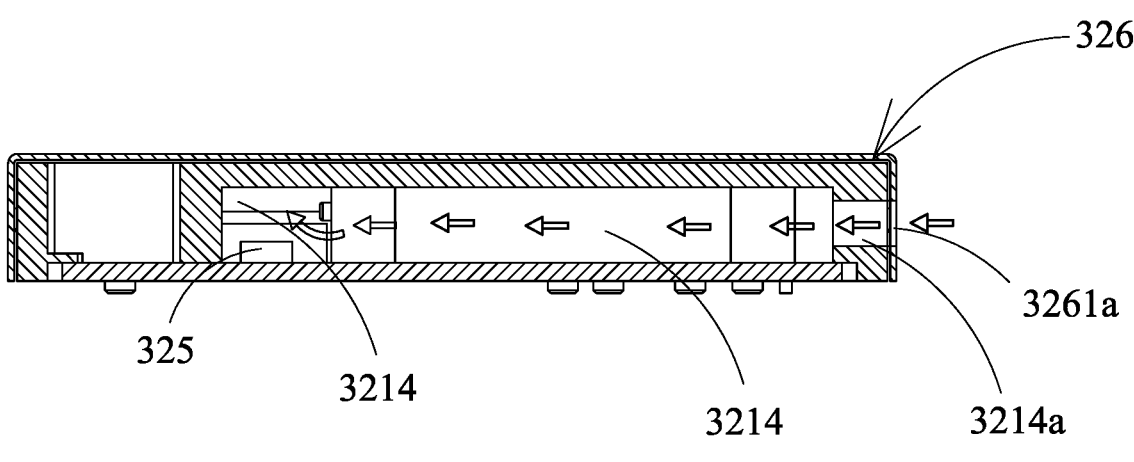
FIG. 10A illustrates a cross-sectional view (1) of the gas detection main body of the gas detection device of the system for detecting and cleaning air pollution in indoor space with heating, ventilation and air conditioning of the exemplary embodiment in the present invention.
Figure 10B:
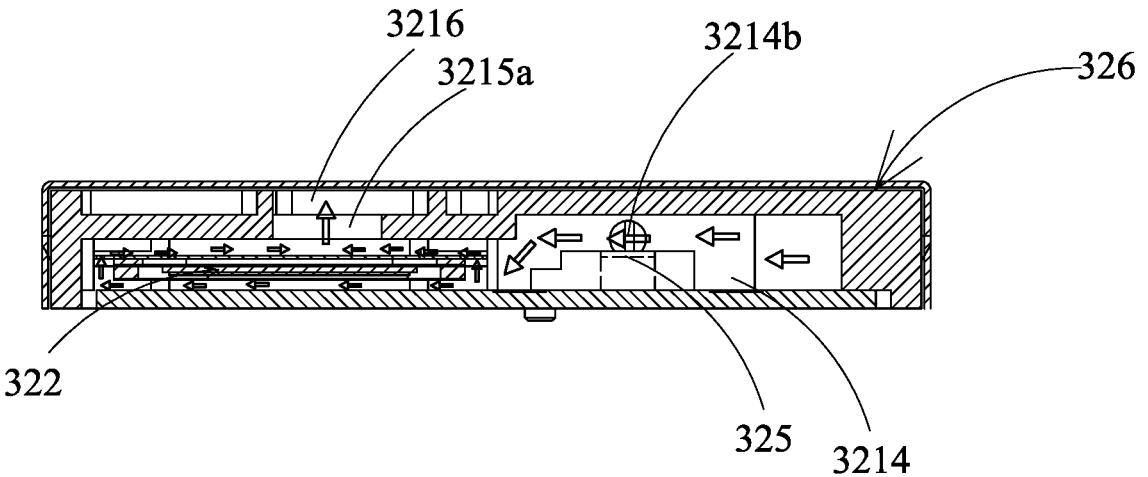
FIG. 10B illustrates a cross-sectional view (2) of the gas detection main body of the gas detection device of the system for detecting and cleaning air pollution in indoor space with heating, ventilation and air conditioning of the exemplary embodiment in the present invention.
Figure 10C:
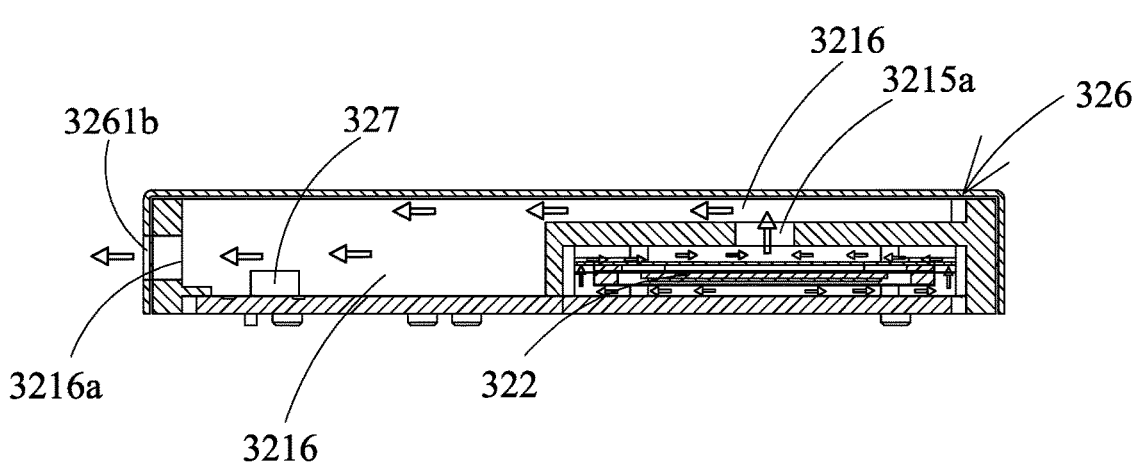
FIG. 10C illustrates a cross-sectional view (3) of the gas detection main body of the gas detection device of the system for detecting and cleaning air pollution in indoor space with heating, ventilation and air conditioning of the exemplary embodiment in the present invention.
Figure 11:
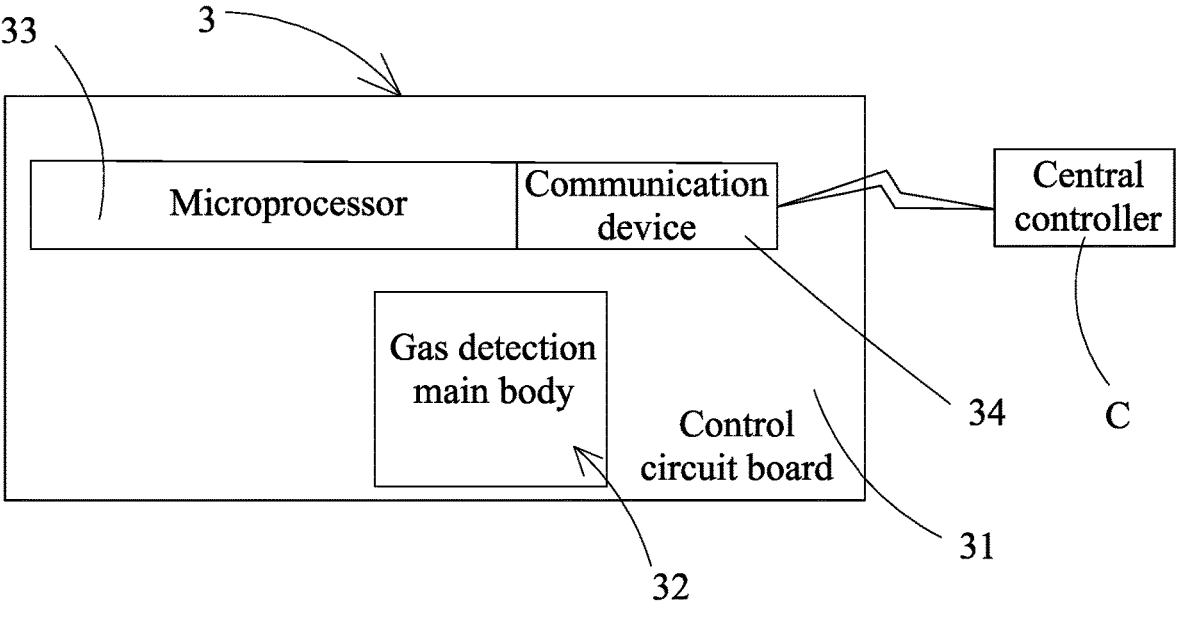
FIG. 11 illustrates a schematic view showing the transmission of the gas detection device of the system for detecting and cleaning air pollution in indoor space with heating, ventilation and air conditioning of the exemplary embodiment in the present invention.

Therefore, through repeating the steps as shown in FIG. 9B and FIG. 9C, the piezoelectric plate 3223c can bend and vibrate in a reciprocating manner. Further, after the gas is discharged out of the resonance chamber 3226, the internal pressure of the resonance chamber 3226 is lower than the equilibrium pressure due to the inertia, as a result, the pressure difference guides the gas outside the resonance chamber 3226 into the resonance chamber 3226 again. Therefore, through controlling the vibration frequency of the gas in the resonance chamber 3226 to be close to the vibration frequency of the piezoelectric plate 3223c, the resonance chamber 3226 and the piezoelectric plate 3223c can generate the Helmholtz resonance effect so as to achieve effective, high-speed, and large-volume gas transmission of the gas. Moreover, the gas enters the gas detection main body 32 from the gas inlet opening 3261a of the outer cover 326, and flows into the gas inlet groove 3214 of the base 321 through the gas inlet through hole 3214a, eventually reaching the position of the particulate sensor 325. Furthermore, the piezoelectric actuator 322 continuously drives the gas into the gas inlet path so as to facilitate the gas inside the detection main body 32 to stably and rapidly pass through the particulate sensor 325. Next, the light beam emitted by the laser component 324 passes through the light penetration windows 3214b, enters the gas inlet groove 3214, and illuminates the gas in the gas inlet groove 3214 which passes through the particulate sensor 325. When the light beam from the particulate sensor 325 illuminates on the particulate matters in the gas, the light beam will be scattered and generate light spots. The particulate sensor 325 receives and calculates the light spots generated by the scattering to obtain the information of the particulate matters in the gas such as the particle size and the number of the particulate matters. Moreover, the gas passing through the particulate sensor 325 is continuously introduced into the ventilation hole 3215a of the gas-guiding component installation region 3215 by the piezoelectric actuator 322 and enters the gas outlet groove 3216. Finally, after the gas enters the gas outlet groove 3216, since the piezoelectric actuator 322 continuously delivers the gas into gas outlet groove 3216, therefore the gas is continuously pushed and discharged out of the gas detection main body 32 through the gas outlet through hole 3216a and the gas outlet opening 3261b.

In some embodiments, the gas detection device 3 not only can detect the particulate matters in the gas, but also can obtain the property of the gas introduced into the gas detection device 3. For example, the gas may be formaldehyde, ammonia, carbon monoxide, carbon dioxide, oxygen, ozone, or the like. Therefore, the gas detection device 3 further includes a gas sensor 327. The gas sensor 327 is disposed on the driving circuit board 323 and is located at the gas outlet groove 3216 for detecting the polluted gas introduced into the gas outlet groove 3216, and the gas sensor 327 is electrically connected to the driving circuit board 323. Therefore, the gas sensor 327 can obtain the concentration or the property of the volatile organic compounds contained in the gas from the gas outlet path.

As above, one or some embodiments of the present invention provides a system for detecting and cleaning air pollution in indoor space with heating, ventilation and air conditioning. In the system, a heating, ventilation and air conditioning (HVAC) device provides an air conditioning modulation mechanism for performing air-heating, air-cooling, and ventilation in the indoor space. In the system, at least one outdoor gas detection device and a plurality of gas detection devices are utilized to detect and compare the indoor gas and the outdoor gas. Moreover, in the system, through the detection of filtering devices (for example, the ventilator, the cooker hood, or the air cleaner) and the indoor gas detection devices in the filtering devices in the indoor space, and through the wireless transmission of a central controller to receive an air pollution data and to control a cloud device, an intelligent computation and comparison is performed to locate an air pollution location in the indoor space, and the control command is transmitted intelligently and selectively to enable the filtering devices to be driven to generate a certain directed air convection, control the HVAC device to determine whether the gas exchange of the indoor space is to be performed, and control an air conditioning modulation mechanism of at least one HVAC component of the HVAC device, thus the circulative filtration and the rapid clean of the air pollution can be achieved by at least one filtering component of each of the filtering devices, allowing the indoor air pollution data to be a safety detection value in which the air pollution data approaches to a non-detection state (almost zero), and the gas (air) in the indoor space is cleaned to a safe and breathable state. Therefore, the air pollution in the indoor space can be filtered and cleaned instantly. Hence, a performance of locating the air pollution, guiding the air pollution, and cleaning and filtering the air pollution can be achieved. which not only can be utilized in an indoor space with a refresh air ventilation device but also can be utilized in an indoor space with an HVAC system. At least one outdoor gas detection device and a plurality of gas detection devices are utilized to detect and compare the indoor gas and the outdoor gas so as to determine whether the air pollution in the indoor space is to be exchanged and discharged to the outdoor space. Moreover, through the detection of the indoor gas detection devices in the filtering devices (for example, the ventilator, the cooker hood, the refresh air ventilation device, or the HVAC system) in the indoor space and the wireless transmission of the control central processor, the intelligent computation is performed to figure out the air pollution location in the indoor space, and the control command is transmitted intelligently and selectively to enable the filtering devices (for example, the ventilator, the cooker hood, the refresh air ventilation device, or the HVAC system) to be driven to generate a certain directed air convection, so that the air pollution can be repeatedly filtered and cleaned rapidly by the filtering component to allow the indoor air pollution data to be a safety detection value in which the air pollution data approaches to almost zero, and the gas in the indoor space is cleaned to a safe and breathable state. Therefore, the air pollution in the indoor space can be filtered and cleaned instantly. Hence, a performance of locating the air pollution, guiding the air pollution, and cleaning and filtering the air pollution can be achieved.

The foregoing outlines features of several embodiments so that those skilled in the art may better understand the aspects of the present invention. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions, and alterations herein without departing from the spirit and scope of the present invention.

What is claimed is:

1. A system for detecting and cleaning air pollution in indoor space with heating, ventilation and air conditioning, comprising:

a heating, ventilation and air conditioning (HVAC) device comprising a gate, at least one channel filtering element, at least one flow-guiding device, a plurality of channels, and at least one HVAC component, wherein the channels are in communication with an indoor space, the gate controls an external gas to be introduced into the indoor space, the at least one flow-guiding device guides the external gas into the channels, so that the external gas is filtered by the at least one channel filtering element and then introduced into the indoor space again, the at least one HVAC component provides an air conditioning modulation mechanism for performing air-heating, air-cooling, and ventilation in the indoor space;

at least one outdoor gas detection device configured to detect a qualitative property and a concentration of an air pollution of the external gas and output an outdoor air pollution data;

a plurality of indoor gas detection devices disposed in the indoor space and configured to detect a qualitative property and a concentration of an air pollution in the indoor space and output an indoor air pollution data;

a plurality of filtering devices disposed in the indoor space, wherein each of the filtering devices comprises at least one blower and at least one filtering component, and each of the filtering devices is provided with a corresponding one of the indoor gas detection devices; and a central controller, wherein the central controller is configured to receive the outdoor air pollution data and the indoor air pollution data, and the central controller is configured to, by connecting to a cloud device, perform an intelligent computation and comparison through artificial intelligence (AI) computation and big data comparison on a highest data among the indoor air pollution data to locate the air pollution location in the indoor space, the cloud device is configured to transmit a control command;

wherein, according to the control command received by the central controller, the control the control command is received by the central controller to control the gate to be opened or closed so as to perform a gas exchange mechanism in the indoor space and to control the air conditioning modulation mechanism of the at least one HVAC component; the indoor gas detection device of at least one of the filtering devices receives the control command to enable the at least one blower of each of the filtering devices so as to generate an air convection which is directed, thereby achieving the filtration of the air pollution by the at least one filtering component of each of the filtering devices to allow the indoor air pollution data to be a safety detection value in which the indoor air pollution data approaches to a non-detection state, and the gas in the indoor space is cleaned to a safe and breathable state.

2. The system for detecting and cleaning air pollution in indoor space with heating, ventilation and air conditioning according to claim 1, wherein the air pollution comprises at least one selected from the group consisting of particulate matters, carbon monoxide, carbon dioxide, ozone, sulfur dioxide, nitrogen dioxide, lead, total volatile organic compounds, formaldehyde, bacteria, fungi, viruses, and any combination thereof.

3. The system for detecting and cleaning air pollution in indoor space with heating, ventilation and air conditioning according to claim 1, wherein each of the indoor gas detection devices is disposed adjacent to a discharge outlet of a corresponding one of the channels of the HVAC device, so that the indoor gas detection devices detect the qualitative property and the concentration of the air pollution of the external gas discharged by the channels and filtered by the at least one filtering component of each of the filtering devices.

4. The system for detecting and cleaning air pollution in indoor space with heating, ventilation and air conditioning according to claim 1, wherein each of the channels of the HVAC device has a return inlet adapted to introduce an indoor gas in the indoor space back into the channels to make the circulative filtration.

5. The system for detecting and cleaning air pollution in indoor space with heating, ventilation and air conditioning according to claim 1, wherein the at least one channel filtering element is a high-efficiency particulate air (HEPA) filter.

6. The system for detecting and cleaning air pollution in indoor space with heating, ventilation and air conditioning according to claim 1, wherein the at least one channel filtering element is a filter having a minimum efficiency reporting value (MERV) 13 or higher.

7. The system for detecting and cleaning air pollution in indoor space with heating, ventilation and air conditioning according to claim 1, wherein the at least one HVAC component comprises at least one selected from the group consisting of a heat pump, an air conditioner, a furnace, an air cleaner, a humidifier, an air scrubber, a dehumidifier, and any combination thereof.

8. The system for detecting and cleaning air pollution in indoor space with heating, ventilation and air conditioning according to claim 1, wherein the safety detection value comprises a detection value in which the indoor air pollution data approaches to almost zero.

9. The system for detecting and cleaning air pollution in indoor space with heating, ventilation and air conditioning according to claim 8, wherein the safety detection value includes at least one selected from the group consisting of a concentration of $PM_{2.5}$ which is less than 15 $\mu g/m^3$, a concentration of carbon dioxide ($CO_2$) which is less than 1000 ppm, a concentration of total volatile organic compounds (TVOC) which is less than 0.56 ppm, a concentration of formaldehyde (HCHO) which is less than 0.08 ppm, a colony-forming unit per cubic meter of bacteria which is less than 1500 CFU/m³, a colony-forming unit per cubic meter of fungi which is less than 1000 CFU/m³, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, a concentration of lead which is less than 0.15 µg/m³, and any combination thereof.

10. The system for detecting and cleaning air pollution in indoor space with heating, ventilation and air conditioning according to claim 1, wherein the transmission of the outdoor air pollution data and the indoor air pollution data is implemented through a wireless communication, and the wireless communication is implemented by using one of a Wi-Fi module, a Bluetooth module, a radiofrequency identification module, and a near field communication module.

11. The system for detecting and cleaning air pollution in indoor space with heating, ventilation and air conditioning according to claim 1, wherein the central controller comprises an HVAC device controller and a main central controller, the HVAC device controller receives a data information and the control command from the main central controller, so that the control command is adapted to control the air conditioning modulation mechanism for performing air-heating, air-cooling, and ventilation in the indoor space.

12. The system for detecting and cleaning air pollution in indoor space with heating, ventilation and air conditioning according to claim 11, wherein the HVAC device controller comprises a display adapted to display the data information, and wherein the data information is an indoor/outdoor temperature and humidity, the indoor air pollution data, the outdoor air pollution data, or the information of an operation mechanism of the at least one HVAC component.

13. The system for detecting and cleaning air pollution in indoor space with heating, ventilation and air conditioning according to claim 1, wherein the cloud device performs the intelligent computation and comparison on the outdoor air pollution data and the indoor air pollution data received by the central controller; if the indoor air pollution data is greater than the outdoor air pollution data, the cloud device transmits the control command to the central controller, and according to the control command, the central controller controls the gate of the HVAC device to be opened and enables the at least one flow-guiding device, so that the air pollution in the indoor space is discharged outside the indoor space rapidly, and the air pollution in the indoor space is filtered by the at least one filtering component of each of the filtering devices and the gas in the indoor space is cleaned to the safe and breathable state.

14. The system for detecting and cleaning air pollution in indoor space with heating, ventilation and air conditioning according to claim 1, wherein the cloud device performs the intelligent computation and comparison on the outdoor air pollution data and the indoor air pollution data received by the central controller; if the indoor air pollution data is less than the outdoor air pollution data, the cloud device transmits the control command to the central controller, and according to the control command, the central controller controls the gate of the HVAC device to be closed so that the external gas is not introduced into the indoor space and controls the air conditioning modulation mechanism of the at least one HVAC component for modulating air-heating, air-cooling, and ventilation in the indoor space, so that the air pollution in the indoor space is filtered by the at least one filtering component of each of the filtering devices and the gas in the indoor space is cleaned to the safe and breathable state.

15. The system for detecting and cleaning air pollution in indoor space with heating, ventilation and air conditioning according to claim 1, wherein the cloud device performs the intelligent computation and comparison through artificial intelligence (AI) computation and big data comparison on the indoor air pollution data detected by at least three of the indoor gas detection devices, and the cloud device locates the air pollution location in the indoor space through the intelligent computation and comparison.

16. The system for detecting and cleaning air pollution in indoor space with heating, ventilation and air conditioning according to claim 1 or 15, wherein after the cloud device locates the air pollution location in the indoor space, the cloud device transmits the control command to the central controller, and the central controller enables a filtering device at the air pollution location and rest of the filtering devices which are outside the air pollution location respectively, enabling the filtering device at the air pollution location to generate the air convection directed to the air pollution; the air convection accelerates the filtering of the air pollution at the air pollution location and the air pollution outside the air pollution location which is diffused, moved, and directed by the air convection, and the filtering components of the rest of the filtering devices outside the air pollution location are enabled, therefore the air pollution in the indoor space is filtered to allow the indoor air pollution data to be the safety detection value in which the air pollution data approaches to the non-detection state, and the gas in the indoor space is cleaned to the safe and breathable state.

17. The system for detecting and cleaning air pollution in indoor space with heating, ventilation and air conditioning according to claim 1, wherein the filtering devices comprises at least one cleaning and filtering device, and the at least one cleaning and filtering device comprises a positioning and directional blower, and the direction blower is capable of being moved upwardly and downwardly, as well as rotating with respect to the at least one cleaning and filter device; wherein the indoor gas detection device of the at least one cleaning and filtering device receives the control command to enable the at least one blower and control the positioning and directional blower to be directed toward the air pollution location so as to generate a directed air convection, thereby achieving the circulative filtration and the rapid clean of the air pollution by the at least one filtering component to allow the indoor air pollution data to be the safety detection value in which the air pollution data approaches to the non-detection state, and the gas in the indoor space is cleaned to the safe and breathable state.

18. The system for detecting and cleaning air pollution in indoor space with heating, ventilation and air conditioning according to claim 1, wherein the filtering component of one of the filtering devices filters the air pollution physically by a filter to block and absorb the air pollution, and the filter is a high-efficiency particulate air filter.

19. The system for detecting and cleaning air pollution in indoor space with heating, ventilation and air conditioning according to claim 1, wherein the filtering component of one of the filtering devices filters the air pollution chemically by applying a degradation layer on the filtering component.

20. The system for detecting and cleaning air pollution in indoor space with heating, ventilation and air conditioning according to claim 19, wherein the degradation layer comprises at least one selected from the group consisting of an activated carbon, a cleansing factor layer having chlorine dioxide, an herbal protection coating layer including the extracts of *Rhus chinensis* Mill and the extracts of *Ginkgo biloba*, a layer of silver ions, a zeolite mesh, and any combination thereof.

21. The system for detecting and cleaning air pollution in indoor space with heating, ventilation and air conditioning according to claim 1, wherein the filtering component of one of the filtering devices filters the air pollution chemically along with a light illumination.

22. The system for detecting and cleaning air pollution in indoor space with heating, ventilation and air conditioning according to claim 21, wherein the light illumination comprises at least one selected from the group consisting of a photocatalyst, a photocatalyst unit of an ultraviolet light, a photo plasma unit of a nanometer light tube, and any combination thereof.

23. The system for detecting and cleaning air pollution in indoor space with heating, ventilation and air conditioning according to claim 1, wherein the filtering component of one of the filtering devices filters the air pollution chemically along with a degradation unit.

24. The system for detecting and cleaning air pollution in indoor space with heating, ventilation and air conditioning according to claim 23, wherein the degradation unit comprises at least one selected from the group consisting of a negative ion unit, a plasma ion unit, and any combination thereof.

25. The system for detecting and cleaning air pollution in indoor space with heating, ventilation and air conditioning according to claim 1, wherein each of the at least one outdoor gas detection device and the indoor gas detection devices is a gas detection device, the gas detection device comprises a control circuit board, a gas detection main body, a microprocessor, and a communication device; the gas detection main body, the microprocessor, and the communication device are integrally packaged and electrically connected to the control circuit board; the microprocessor controls the operation of the gas detection main body, the gas detection main body detects the air pollution and output a detection signal, and the microprocessor receives the detection signal to perform computation to generate the indoor air pollution data and the outdoor air pollution data and provides the indoor air pollution data and outdoor air pollution data to the communication device through a wireless transmission so as to transmit the indoor air pollution data and outdoor air pollution data to the central controller.

26. The system for detecting and cleaning air pollution in indoor space with heating, ventilation and air conditioning according to claim 25, wherein the gas detection main body comprises:

a base, having:
a first surface;
a second surface opposite to the first surface;
a laser installation region hollowed out from the first surface to the second surface;
a gas inlet groove recessed from the second surface and located adjacent to the laser installation region, wherein the gas inlet groove has a gas inlet through hole and two lateral walls; two light penetration windows penetrate on the two lateral walls of the gas inlet groove and are in communication with the laser installation region;
a gas-guiding component installation region recessed from the second surface and in communication with the gas inlet groove, wherein a ventilation hole penetrates a bottom surface of the gas-guiding component installation region; and a gas outlet groove including a first region and a second region, wherein the first region is corresponding to the gas-guiding component installation region and is recessed from a portion of the first surface corresponding to a bottom surface of the gas-guiding component installation region; the second region is hollowed out from the first surface to the second surface in a region that is not corresponding to the gas-guiding component installation region; the gas outlet groove is in communication with the ventilation hole and has a gas outlet through hole;

a piezoelectric actuator received in the gas-guiding component installation region;

a driving circuit board covering and attached to the second surface of the base;

a laser component disposed on and electrically connected to the driving circuit board, wherein the laser component is received in the laser installation region, and a light path of a light beam emitted by the laser component passes through the light penetration windows and is orthogonal to the gas inlet groove;

a particulate sensor disposed on and electrically connected to the driving circuit board, wherein the particulate sensor is received in a position of the gas inlet groove where the path of the light beam emitted by the laser component is orthogonal to the gas inlet groove, so that the particulates in the air pollution passing through the gas inlet groove which is illuminated by the light beam of the laser component is detected by the particulate sensor;

a gas sensor disposed on and electrically connected to the driving circuit board, wherein the gas sensor is received in the gas outlet groove for detecting the air pollution introduced into the gas outlet groove; and an outer cover covering the base and having a side plate, and the side plate has a gas inlet opening and a gas outlet opening, the gas inlet opening is corresponding to the gas inlet through hole of the base, and the gas outlet opening is corresponding to the gas outlet through hole of the base;

wherein when the outer cover is covered on the base and the driving circuit board is attached to the second surface of the base, a gas inlet path is defined by the gas inlet groove and a gas outlet path is defined by the gas outlet groove, thereby the piezoelectric actuator is driven to accelerate the introduction of the air pollution outside the gas inlet through hole into the gas inlet path defined by the gas inlet groove from the gas inlet opening; the air pollution passes through the particulate sensor to detect a particle concentration of the particulates contained in the air pollution; and the air pollution discharged into the gas outlet path defined by the gas outlet groove from the ventilation hole, detected by the gas sensor, and is discharged out of the gas detection main body from the gas outlet through hole and the gas outlet opening of the base.

27. The system for detecting and cleaning air pollution in indoor space with heating, ventilation and air conditioning according to claim 26, wherein the particulate sensor is capable of detecting information of particulate matters.

28. The system for detecting and cleaning air pollution in indoor space with heating, ventilation and air conditioning according to claim 26, wherein the gas sensor comprises at least one selected from the group consisting of a volatile organic compound detector, a formaldehyde sensor, a bacterial sensor, a virus sensor, and any combination thereof; the volatile organic compound detector is capable of detecting information of carbon dioxide or total volatile organic compounds; the formaldehyde sensor is capable of detecting information of formaldehyde (HCHO) gas; the bacterial sensor is capable of detecting information of bacteria or fungi; the virus sensor is capable of detecting information of viruses.

29. The system for detecting and cleaning air pollution in indoor space with heating, ventilation and air conditioning according to claim 1, wherein the system further comprises a mobile device, the mobile device receives a data information from the central controller by connecting to the cloud device, and the mobile device displays the data information; the data information is an indoor/outdoor temperature and humidity, the indoor air pollution data, the outdoor air pollution data, or the information of the air conditioning modulation mechanism of the at least one HVAC component, so that the mobile device is adapted to transmit the control command to the central controller to control the air conditioning modulation mechanism for performing air-heating, air-cooling, and ventilation in the indoor space.

30. The system for detecting and cleaning air pollution in indoor space with heating, ventilation and air conditioning according to claim 29, wherein the mobile device is adapted to transmit the control command, control the central controller to receive the control command by connecting to the cloud device, and control the indoor gas detection device of at least one of the filtering devices to receive the control command to enable the at least one blower of each of the filtering devices so as to generate the air convection which is directed, thereby achieving the filtration of the air pollution by the at least one filtering component of each of the filtering devices to allow the indoor air pollution data to be the safety detection value in which the indoor air pollution data approaches to the non-detection state, and the gas in the indoor space is cleaned to the safe and breathable state.

*   *   *   *   *